United States Patent
Peterson et al.

(10) Patent No.: US 10,561,272 B2
(45) Date of Patent: Feb. 18, 2020

(54) SELECTIVELY SEALABLE LINER FOR A VESSEL

(71) Applicants: David E. Peterson, Traverse City, MI (US); Matthew P. Klein, Suttons Bay, MI (US)

(72) Inventors: David E. Peterson, Traverse City, MI (US); Matthew P. Klein, Suttons Bay, MI (US)

(73) Assignee: Plascon Packaging, Inc., Traverse City, MI (US)

( * ) Notice: Subject to any disclaimer, the term of this patent is extended or adjusted under 35 U.S.C. 154(b) by 0 days.

(21) Appl. No.: 14/836,232

(22) Filed: Aug. 26, 2015

(65) Prior Publication Data

US 2015/0359379 A1    Dec. 17, 2015

Related U.S. Application Data

(63) Continuation-in-part of application No. 14/533,658, filed on Nov. 5, 2014.

(60) Provisional application No. 61/900,102, filed on Nov. 5, 2013.

(51) Int. Cl.
*A47J 31/46* (2006.01)
*B65D 47/06* (2006.01)
*B67D 3/00* (2006.01)

(52) U.S. Cl.
CPC ............ *A47J 31/46* (2013.01); *B65D 47/06* (2013.01); *B67D 3/0067* (2013.01); *B67D 3/0083* (2013.01); *B67D 2210/00062* (2013.01); *Y10T 29/49826* (2015.01)

(58) Field of Classification Search
CPC ....... A47J 31/46; B65D 47/06; B67D 3/0067; B67D 3/0083
USPC ...................... 222/185.1; 383/64, 69; 99/279
See application file for complete search history.

(56) References Cited

U.S. PATENT DOCUMENTS

| 172,929 A | 2/1876 | Newton |
| 261,354 A | 7/1882 | Johnson |
| 2,377,261 A * | 5/1945 | Norris ................. B67D 1/1405 222/184 |
| 2,549,207 A * | 4/1951 | Kestenbaum ............ B67D 1/04 177/234 |
| 2,601,319 A * | 6/1952 | Norris .................... B67D 3/041 222/131 |

(Continued)

FOREIGN PATENT DOCUMENTS

| AU | 1997018381 82 | 8/1997 |
| EP | 0084699 A1 | 8/1983 |

(Continued)

*Primary Examiner* — Patrick M. Buechner
*Assistant Examiner* — Michael J. Melaragno
(74) *Attorney, Agent, or Firm* — Fishman Stewart PLLC

(57) ABSTRACT

A beverage system may include a beverage maker, a vessel, and a liner assembly. The liner assembly may comprise a liner configured for the vessel, an integrated closure mechanism, a flexible tube; and a cuff having an interlock surface. The cuff may be received in at least a portion of the tube thereby securing the liner and the tube. The interlock surface may be configured to provide a first seal between at least the cuff and the liner. The integrated closure mechanism may be configured to provide a second seal on an upper portion of the liner. A method of using same is further provided.

24 Claims, 17 Drawing Sheets

(56) References Cited

U.S. PATENT DOCUMENTS

| | | | | |
|---|---|---|---|---|
| 2,681,747 A | * | 6/1954 | Norris | B65D 7/04 222/183 |
| 2,718,985 A | * | 9/1955 | Tamminga | B67D 3/00 137/375 |
| 2,815,887 A | * | 12/1957 | Ford | B65D 25/14 220/495.06 |
| 2,831,610 A | * | 4/1958 | Dennie | B65D 5/5059 222/105 |
| 2,861,718 A | * | 11/1958 | Winzen | B65D 75/5816 222/105 |
| 2,905,560 A | * | 9/1959 | Bender | A01J 9/00 141/65 |
| 3,081,911 A | * | 3/1963 | Scholle | B65D 77/065 222/105 |
| 3,087,655 A | * | 4/1963 | Scholle | B65D 77/065 222/105 |
| 3,089,622 A | * | 5/1963 | Westlake, Jr. | B65D 77/065 222/183 |
| 3,094,154 A | * | 6/1963 | Daniels | B67D 1/06 141/369 |
| 3,096,912 A | * | 7/1963 | Rivette | B65D 61/00 222/105 |
| 3,112,047 A | * | 11/1963 | Weinreich | B65D 77/065 222/105 |
| 3,123,254 A | * | 3/1964 | Rabby et al. | B65D 77/065 222/105 |
| 3,137,415 A | * | 6/1964 | Faunce | B65D 25/42 220/495.06 |
| 3,138,293 A | * | 6/1964 | Roak | B65D 75/5816 222/105 |
| 3,173,579 A | * | 3/1965 | Curie | B65D 47/283 222/105 |
| 3,178,063 A | * | 4/1965 | Cox, Jr. | B65B 3/045 222/105 |
| 3,212,681 A | * | 10/1965 | Weikert | B65D 25/38 222/153.08 |
| 3,239,104 A | * | 3/1966 | Scholle | B67B 7/26 222/514 |
| 3,255,923 A | * | 6/1966 | Soto | A61J 1/10 206/223 |
| 3,325,058 A | * | 6/1967 | West, Jr. | A47J 31/50 219/433 |
| 3,606,396 A | * | 9/1971 | Prosdocimo | F16L 33/222 285/148.16 |
| 3,792,799 A | * | 2/1974 | Henfrey | B65D 75/5877 222/1 |
| 3,837,533 A | * | 9/1974 | Splan | B65D 35/14 222/105 |
| 3,868,130 A | * | 2/1975 | Schwertner | F16L 33/225 285/243 |
| 3,920,163 A | * | 11/1975 | Brown | B67D 3/00 222/190 |
| 3,945,534 A | * | 3/1976 | Ady | A47J 47/01 222/105 |
| 3,949,744 A | * | 4/1976 | Clarke | A61M 5/14 210/446 |
| 3,976,277 A | * | 8/1976 | Basel | F16K 7/06 222/529 |
| 4,044,989 A | * | 8/1977 | Basel | F16K 7/06 251/7 |
| 4,076,147 A | * | 2/1978 | Schmit | B31B 7/00 222/105 |
| 4,334,640 A | * | 6/1982 | van Overbruggen | B67D 1/0079 128/DIG. 12 |
| 4,375,864 A | * | 3/1983 | Savage | B65D 77/067 141/349 |
| 4,445,539 A | * | 5/1984 | Credle | B65D 83/0055 137/614.03 |
| 4,475,670 A | * | 10/1984 | Rutter | B65D 77/067 222/105 |
| 4,513,885 A | * | 4/1985 | Hogan | B67D 7/0205 222/105 |
| 4,516,691 A | * | 5/1985 | Christine | B67B 7/26 222/522 |
| 4,516,692 A | * | 5/1985 | Croley | B65D 77/061 222/105 |
| 4,516,693 A | * | 5/1985 | Gaston | B65D 77/06 222/105 |
| 4,528,161 A | * | 7/1985 | Eckert | B01L 3/0206 222/191 |
| 4,562,940 A | * | 1/1986 | Asphar | B67B 7/28 222/88 |
| 4,606,476 A | * | 8/1986 | Pocock | B67D 1/07 134/169 R |
| 4,722,458 A | * | 2/1988 | Van Dal | B67D 3/042 222/105 |
| 4,776,488 A | * | 10/1988 | Gurzan | B65D 75/5872 222/107 |
| 4,817,811 A | * | 4/1989 | Pfeiffer | B65D 77/061 206/386 |
| 4,898,303 A | * | 2/1990 | Large | B67D 1/16 141/114 |
| 4,911,399 A | * | 3/1990 | Green | A61M 39/285 251/4 |
| 4,919,306 A | * | 4/1990 | Heaps, Jr. | B65D 77/061 222/105 |
| 4,925,216 A | * | 5/1990 | Steer | A61J 1/10 285/200 |
| 4,948,014 A | * | 8/1990 | Rutter | B65D 77/067 137/614.04 |
| 5,064,096 A | * | 11/1991 | Illing | B65D 77/061 222/105 |
| 5,141,133 A | * | 8/1992 | Ninomiya | B65D 5/748 222/541.2 |
| 5,188,259 A | * | 2/1993 | Petit | B05C 17/0103 222/146.5 |
| 5,245,914 A | * | 9/1993 | Vitous | A47J 31/007 99/280 |
| 5,249,716 A | * | 10/1993 | O'Sullivan | B05C 17/00516 222/326 |
| 5,272,236 A | * | 12/1993 | Lai | B29C 47/0004 502/152 |
| 5,334,180 A | * | 8/1994 | Adolf | A61J 1/05 222/81 |
| 5,375,741 A | * | 12/1994 | Harris | B65D 77/061 222/105 |
| 5,407,099 A | * | 4/1995 | Heuke | B67B 7/26 222/83 |
| 5,516,693 A | * | 5/1996 | Vaeck | C07K 14/325 435/252.33 |
| 5,549,673 A | * | 8/1996 | Beale | A61F 2/20 128/898 |
| 5,551,602 A | * | 9/1996 | Kurtzahn | A47J 41/02 141/18 |
| 5,639,015 A | * | 6/1997 | Petriekis | B65D 5/323 229/122.24 |
| 5,647,511 A | * | 7/1997 | Bond | B65B 61/186 222/105 |
| 5,680,959 A | * | 10/1997 | Ettore | B31B 7/00 222/1 |
| 5,697,410 A | * | 12/1997 | Rutter | F16L 37/32 137/614.04 |
| 5,701,650 A | * | 12/1997 | LaFleur | B29C 65/00 29/235 |
| 5,732,854 A | * | 3/1998 | Ruben | B65D 35/32 222/100 |
| 5,797,524 A | * | 8/1998 | Lentz | B65D 47/2025 222/1 |
| 5,884,648 A | * | 3/1999 | Savage | B67D 7/0294 137/1 |
| 5,901,761 A | | 5/1999 | Rutter et al. | |
| 5,947,603 A | * | 9/1999 | Tilman | B65D 33/2591 160/124 |
| 5,983,964 A | * | 11/1999 | Zielinksi | F16L 29/00 137/614.04 |

(56) References Cited

U.S. PATENT DOCUMENTS

| | | | | |
|---|---|---|---|---|
| 6,053,360 A * | 4/2000 | Rutter | A61J 1/10 | 222/1 |
| 6,062,413 A * | 5/2000 | Redmond | B29C 51/08 | 206/469 |
| 6,073,807 A * | 6/2000 | Wilford | B65D 75/5877 | 222/105 |
| 6,082,584 A * | 7/2000 | Stern | B65D 75/5877 | 222/107 |
| 6,098,845 A * | 8/2000 | Stern | B65D 75/5877 | 222/83 |
| 6,116,467 A * | 9/2000 | Petriekis | B65D 77/06 | 141/114 |
| 6,131,767 A * | 10/2000 | Savage | B67D 3/043 | 222/1 |
| 6,138,878 A * | 10/2000 | Savage | B67D 3/043 | 222/517 |
| 6,168,074 B1 * | 1/2001 | Petriekis | B65D 5/323 | 229/122.24 |
| 6,200,300 B1 * | 3/2001 | Petriekis | B65D 75/563 | 206/219 |
| 6,202,370 B1 * | 3/2001 | Miller | B28B 7/0008 | 52/169.14 |
| 6,305,844 B1 * | 10/2001 | Bois | B65D 33/2591 | 24/399 |
| 6,378,730 B1 * | 4/2002 | Reddy | B67B 7/26 | 222/541.9 |
| 6,398,073 B1 * | 6/2002 | Nicolle | B67B 7/28 | 222/105 |
| 6,460,732 B1 * | 10/2002 | Drennow | B65D 51/222 | 222/107 |
| 6,607,097 B2 * | 8/2003 | Savage | B65D 75/5877 | 220/62.12 |
| 6,608,636 B1 * | 8/2003 | Roseman | G09B 5/14 | 348/E7.083 |
| 6,609,636 B1 | 8/2003 | Petriekis et al. | | |
| 6,659,132 B2 * | 12/2003 | Smith | B65D 90/046 | 138/89 |
| 6,679,304 B1 * | 1/2004 | Vacca | B65D 75/5883 | 141/18 |
| 6,883,683 B1 * | 4/2005 | Cunningham | B65D 75/58 | 222/107 |
| 6,996,879 B1 * | 2/2006 | Savicki | B65D 33/2591 | 24/30.5 R |
| 7,090,257 B2 * | 8/2006 | Werth | F16L 33/225 | 285/243 |
| 7,275,662 B1 * | 10/2007 | Milcetich | B67D 3/0083 | 211/74 |
| 7,316,329 B2 * | 1/2008 | Wertenberger | B65D 77/06 | 222/105 |
| 7,334,702 B2 | 2/2008 | Cunningham et al. | | |
| 7,452,317 B2 * | 11/2008 | Graham | B31B 7/00 | 493/101 |
| 7,496,992 B2 * | 3/2009 | Ausnit | B65D 33/2591 | 24/30.5 R |
| 7,543,723 B2 * | 6/2009 | Wilford | B65D 47/242 | 137/588 |
| 7,574,782 B2 * | 8/2009 | Ackerman | A44B 19/267 | 24/400 |
| 7,607,555 B2 | 10/2009 | Smith | | |
| 7,641,170 B2 * | 1/2010 | Spray | B67D 1/1405 | 222/212 |
| 7,721,755 B2 * | 5/2010 | Smith | F16K 3/246 | 137/384 |
| 7,721,774 B2 * | 5/2010 | Cook | B65B 39/00 | 141/331 |
| 7,721,921 B2 * | 5/2010 | Ramusch | B67D 1/1422 | 222/212 |
| 7,757,907 B2 * | 7/2010 | Smith | B65D 75/5866 | 222/189.07 |
| 7,922,212 B2 * | 4/2011 | Werth | F16L 33/225 | 285/242 |
| 7,922,213 B2 * | 4/2011 | Werth | F16L 33/2071 | 285/242 |
| 7,980,424 B2 | 7/2011 | Johnson | | |
| 8,006,874 B2 * | 8/2011 | Smith | B67D 3/043 | 222/505 |
| 8,052,012 B2 * | 11/2011 | Kelly | B05B 1/30 | 222/399 |
| 8,083,109 B2 | 12/2011 | Smith et al. | | |
| 8,091,864 B2 * | 1/2012 | Smith | F16K 15/063 | 251/148 |
| 8,113,239 B2 * | 2/2012 | Richards | B67D 3/044 | 137/587 |
| D676,320 S * | 2/2013 | Richards | B67D 3/044 | D9/449 |
| 8,397,958 B2 * | 3/2013 | Smith | B65D 47/2031 | 222/105 |
| 8,459,510 B2 * | 6/2013 | Richards | B65D 47/249 | 222/188 |
| 8,459,511 B2 * | 6/2013 | Darby | B65D 77/067 | 222/522 |
| 8,752,734 B2 | 6/2014 | Smith et al. | | |
| 8,757,441 B2 | 6/2014 | Smith et al. | | |
| 9,090,443 B1 * | 7/2015 | Malinski | B67D 3/0067 | |
| 9,750,314 B2 * | 9/2017 | Ausnit | A44B 19/32 | |
| 2002/0131654 A1 * | 9/2002 | Smith | B65D 88/1656 | 383/96 |
| 2004/0099687 A1 * | 5/2004 | Magermans | B67D 1/0412 | 222/105 |
| 2004/0104246 A1 * | 6/2004 | Kawaguchi | A61J 15/00 | 222/83 |
| 2005/0023292 A1 * | 2/2005 | Market | A45F 3/20 | 222/105 |
| 2005/0269354 A1 * | 12/2005 | Smith | B67D 3/0019 | 222/83 |
| 2006/0261088 A1 * | 11/2006 | Chin | B67D 3/00 | 222/131 |
| 2007/0006737 A1 * | 1/2007 | Hart | A47J 31/007 | 99/275 |
| 2007/0194045 A1 * | 8/2007 | Py | B65B 39/004 | 222/105 |
| 2007/0205216 A1 * | 9/2007 | Smith | B65D 77/067 | 222/81 |
| 2007/0284389 A1 * | 12/2007 | Jacobs | B65D 9/04 | 222/1 |
| 2008/0003337 A1 * | 1/2008 | Rasmussen | B65D 85/816 | 426/433 |
| 2008/0029540 A1 * | 2/2008 | Johnson | B65D 75/5877 | 222/83 |
| 2008/0245816 A1 * | 10/2008 | Armstrong | B67B 7/24 | 222/81 |
| 2008/0247681 A1 * | 10/2008 | Stolmeier | B65D 31/10 | 383/64 |
| 2009/0127285 A1 * | 5/2009 | Hoare | B65D 47/2018 | 222/83 |
| 2010/0072224 A1 * | 3/2010 | Ha | B65D 35/26 | 222/107 |
| 2010/0200613 A1 * | 8/2010 | Smith | B67D 3/0054 | 222/105 |
| 2010/0206900 A1 * | 8/2010 | Dobrusskin | B67D 1/0079 | 222/95 |
| 2010/0296858 A1 * | 11/2010 | Richards | B65D 47/248 | 401/206 |
| 2011/0046585 A1 * | 2/2011 | Weston | A61F 15/008 | 604/320 |
| 2011/0069911 A1 * | 3/2011 | Ackerman | A45C 11/20 | 383/64 |
| 2011/0103716 A1 * | 5/2011 | Reilly | B65D 33/01 | 383/64 |
| 2011/0309279 A1 * | 12/2011 | Richards | B67D 7/0294 | 251/149.7 |
| 2012/0027322 A1 * | 2/2012 | Ackerman | A44B 19/16 | 383/64 |
| 2012/0223095 A1 | 9/2012 | Smith | | |
| 2012/0234864 A1 * | 9/2012 | Liu | B67D 3/00 | 222/185.1 |

(56) References Cited

U.S. PATENT DOCUMENTS

| | | | | |
|---|---|---|---|---|
| 2012/0305595 A1* | 12/2012 | Braun | | B67D 3/0009 |
| | | | | 222/105 |
| 2012/0318821 A1* | 12/2012 | Merner | | B65D 77/065 |
| | | | | 222/105 |
| 2013/0028539 A1* | 1/2013 | Vonwiller | | B65D 33/2591 |
| | | | | 383/64 |
| 2013/0037568 A1 | 2/2013 | Smith et al. | | |
| 2013/0098947 A1* | 4/2013 | Richards | | B65D 47/32 |
| | | | | 222/484 |
| 2013/0126561 A1 | 5/2013 | Smith et al. | | |
| 2013/0251868 A1* | 9/2013 | Wells | | A47J 31/46 |
| | | | | 426/435 |
| 2013/0343678 A1* | 12/2013 | Burggren | | B65D 33/2591 |
| | | | | 383/64 |
| 2014/0119678 A1* | 5/2014 | Ausnit | | B65D 33/2591 |
| | | | | 383/64 |
| 2015/0091295 A1* | 4/2015 | Meyer | | F16L 19/005 |
| | | | | 285/89 |
| 2015/0122844 A1* | 5/2015 | Klein | | B67D 3/0067 |
| | | | | 222/185.1 |
| 2015/0359379 A1* | 12/2015 | Peterson | | A47J 31/46 |
| | | | | 53/469 |
| 2016/0272477 A1* | 9/2016 | Bellmore | | B65D 77/065 |
| 2019/0031491 A1* | 1/2019 | Smith | | B67D 3/0061 |

FOREIGN PATENT DOCUMENTS

| | | |
|---|---|---|
| EP | 0777604 A1 | 6/1997 |
| EP | 1147055 A1 | 10/2001 |
| GB | 1416816 A | 12/1975 |
| WO | WO-2008014605 A1 | 2/2008 |
| WO | WO-2009019610 A2 | 2/2009 |
| WO | WO-2010100435 A1 | 9/2010 |
| WO | WO-2012073004 A2 | 6/2012 |

* cited by examiner

SELECTIVELY SEALABLE LINER FOR A VESSEL

CROSS-REFERENCE TO RELATED APPLICATIONS

This continuation-in-part application is based on and claims priority to U.S. patent application Ser. No. 14/533,658, filed Nov. 5, 2014, which is based and claims priority to U.S. Provisional Patent Application No. 61/900,102, filed Nov. 5, 2013, all of which are hereby incorporated by reference in their entirety.

FIELD OF TECHNOLOGY

A fluid dispensing assembly, and more particular, a flexible, disposable, tamper-resistant, and selectively sealable, food defense liner assembly for dispensing fluids with a vessel, beverage making and filling system, and methods of manufacturing and assembling the same.

BACKGROUND

A containment assembly such as urns or vessels may be used for holding and serving liquid or beverages. Typical assemblies may be constructed of metal and thus require cleaning after usage. In a restaurant environment, it is generally preferred to clean such vessels at the end of each shift so as to maintain cleanliness. However such a cleaning task requires increased man power and other resources and such is not preferred.

Another containment assembly uses a plastic bag assembly that is positioned within a containment vessel having a dispensing valve, which in turn is used to deliver beverages to consumers. These bag assemblies may be formed of a two-layer plastic sheet that is heat sealed on three sides with a spout that is heat sealed to an outer surface and over an aperture in one side of the plastic sheet. To fluidly connect with the dispensing valve, the typical spout is releasably received into a fitment connected to an elongated dispensing tube. As a result, the traditional spout may be physically separated from the elongated dispensing tube by the fitment. To dispense beverages, the elongated dispensing tube is passed into the dispensing valve of the containment vessel to be selectively operated by customers. Thus, typical plastic bag assemblies may include excess components thereby unnecessarily increasing material costs and complexity of installation and manufacture.

Further, typical bag assemblies are not tamper-resistant. After beverages have been dispensed or at the end of a work shift, the containment assembly should be cleaned by throwing away the plastic bag assembly. However, traditional bag assemblies include a releasable connection between the spout and fitment. This releasable connection may be utilized to reuse portions or all of the bag assembly, which may lead to unsanitary conditions. As a result, there is a need for a tamper-resistant liner assembly.

Moreover, traditional bag assemblies lack a convenient mechanism to selectively seal the top of the bag with food defense in mind, e.g., closed during use and open during refilling. Traditional bags may be closed by folding over or bunching the top of the bag, but this fails to provide an effective seal at the top. Even if the top is knotted or permanently sealed, re-opening the bag my damage the top of the bag. Thus, it may be desirable to provide a selectively sealable container assembly.

Additionally, selectively sealable liners are a food defense mechanism deterring anyone from contaminating the liquid product easily. By closing the liner with the top seal a person must go through another time consuming step in order to willfully contaminate the product being dispensed.

Other containment assembly designs employ expensive plastic bags that employ complex valves and dispensing systems that in turn may be used with a vessel. It would be helpful to provide selectively sealable disposable container assembly that has improved functionality, a reduction in the number of working components, is a food defense mechanism, yet is more cost competitive for the beverage industry.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

The exemplary assembly may include a rigid vessel such as an urn, a liner such as a flexible fitted liner with an integrated closure mechanism configured to selectively provide open and closed configurations, a cuff such as a friction cuff configured to be positionable on an inner wall of the liner, a tube such as a flexible tube positionable on an outer wall of the liner, and a spigot that allows for the flexible tubing to be inserted therethrough. The vessel may further include a flow operator that pinches the tube to allow controlled dispensing.

The assembly may be configured to allow for sanitary dispensing of beverages for human consumption. The assembly may be configured such that the beverage may bypass the urn or the spigot for easy cleaning Instead, the assembly may be configured such that the liquid is handled by the liner, cuff, and tube thereby minimizing or preventing contact between the liquid from the vessel.

A beverage system may comprise a beverage maker, a vessel, and a liner assembly. The liner assembly may be configured to be positioned within at least a portion of the vessel. The liner assembly may include a liner having an upper portion and a lower portion, an integrated closure mechanism on the upper portion and configured to selectively provide open and closed configurations, a flexible tube on the lower portion, and a cuff having an interlock surface.

Methods of using a beverage system are also contemplated. A method may comprise positioning a liner assembly in a vessel, positioning the liner assembly relative to a beverage maker, passing fluid from the beverage maker into the liner assembly, positioning a blocking member in the tube, sealing the integrated closure mechanism, and removing the liner assembly from the vessel.

Figure 1:
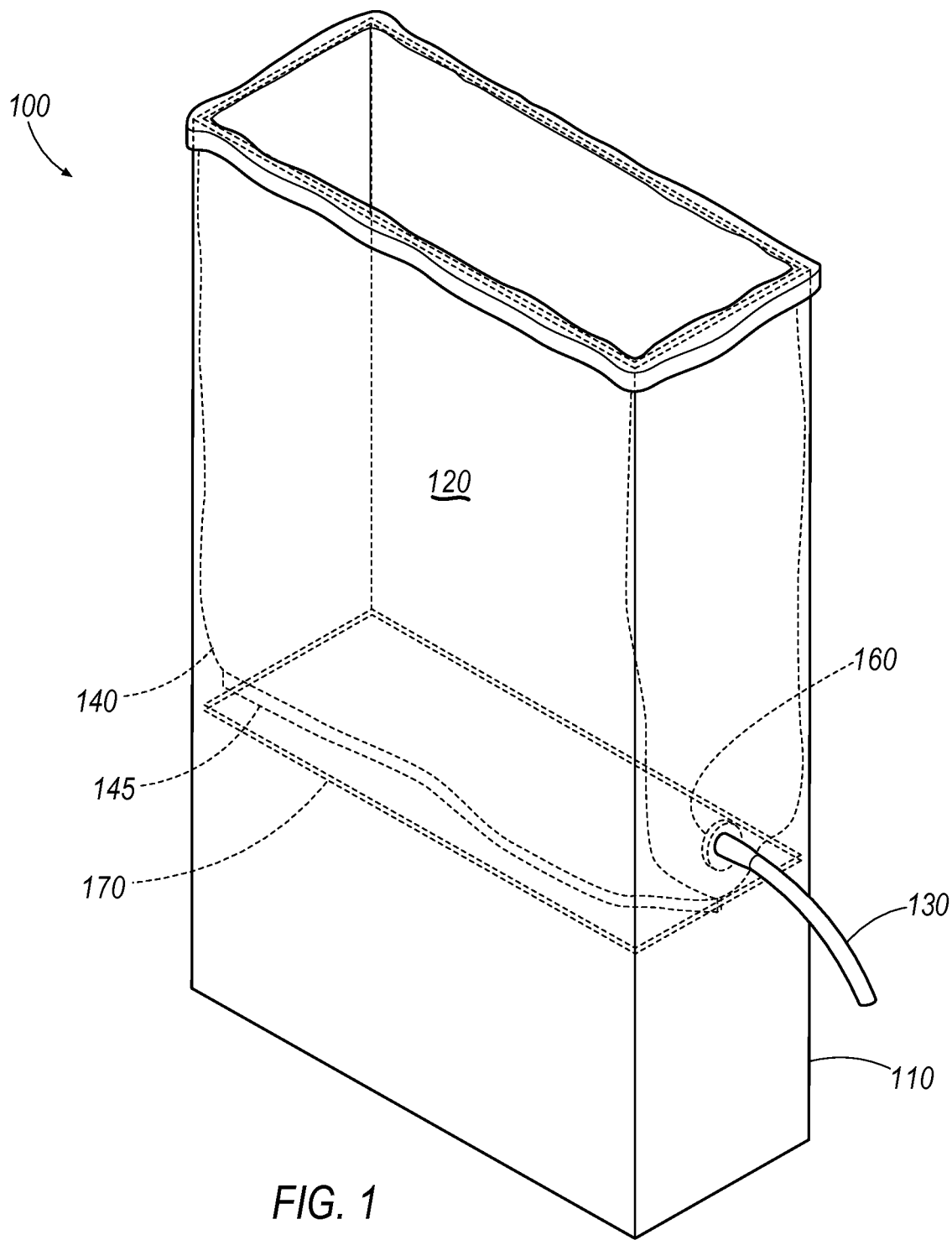
FIG. 1 illustrates a perspective view of an improved containment assembly.
Figure 2:
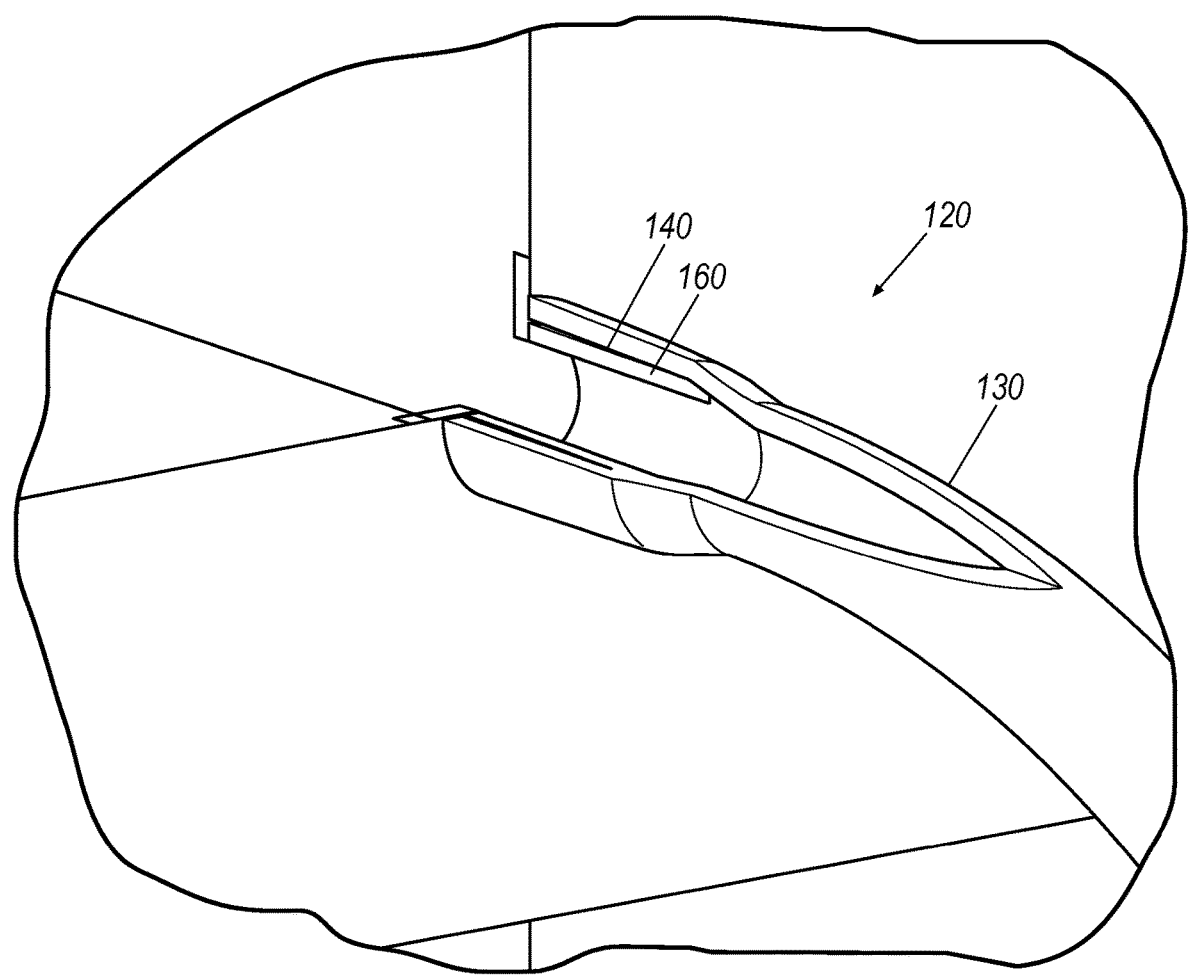
FIG. 2 illustrates an enlarged perspective view of the FIG. 1, for example, including a liner assembly having with a tube, a liner, and a cuff with a flange.

With reference to FIGS. 1-2, a containment assembly 100 may include a vessel 110 and a liner assembly 120. The vessel 110 may include any liquid or beverage dispenser such as a beverage or tea urn. As shown in FIG. 2, the liner assembly 120 may include a tube 130, a liner 140 such as a flexible liner, and a cuff 160 such as a rigid cuff with or without a flange. The liner 140 may be specially dimensioned and configured to match an internal cavity of the vessel 110 and the liner 140 and vessel 110 may include a tapered bottom portion to facilitate flow of liquid therefrom, as discussed in more detail below.

Figure 3:
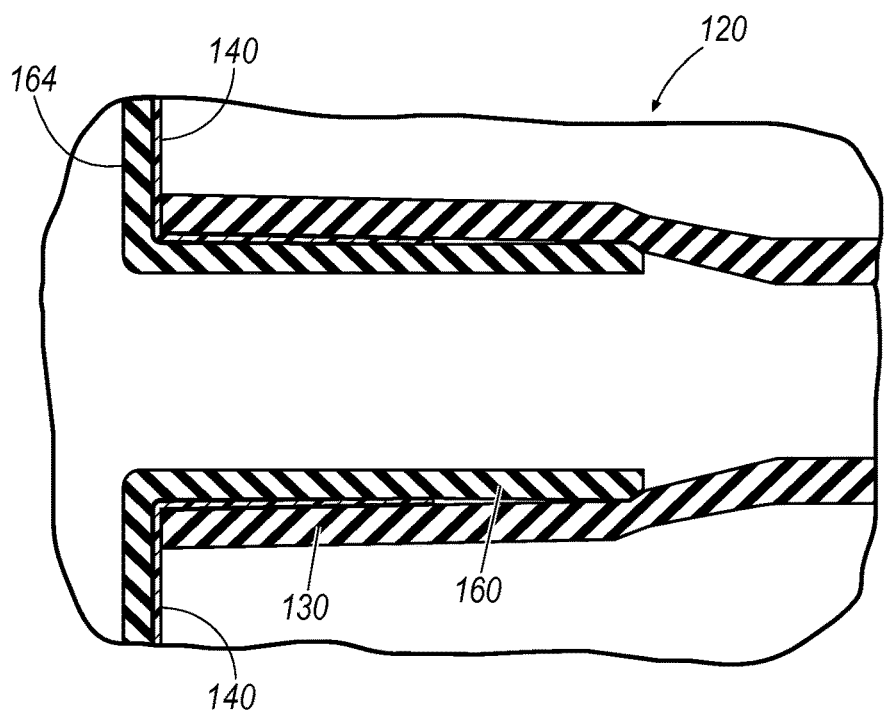
FIG. 3 illustrates an enlarged side view of FIG. 2, for example, showing the liner assembly of FIG. 2.
Figure 5:
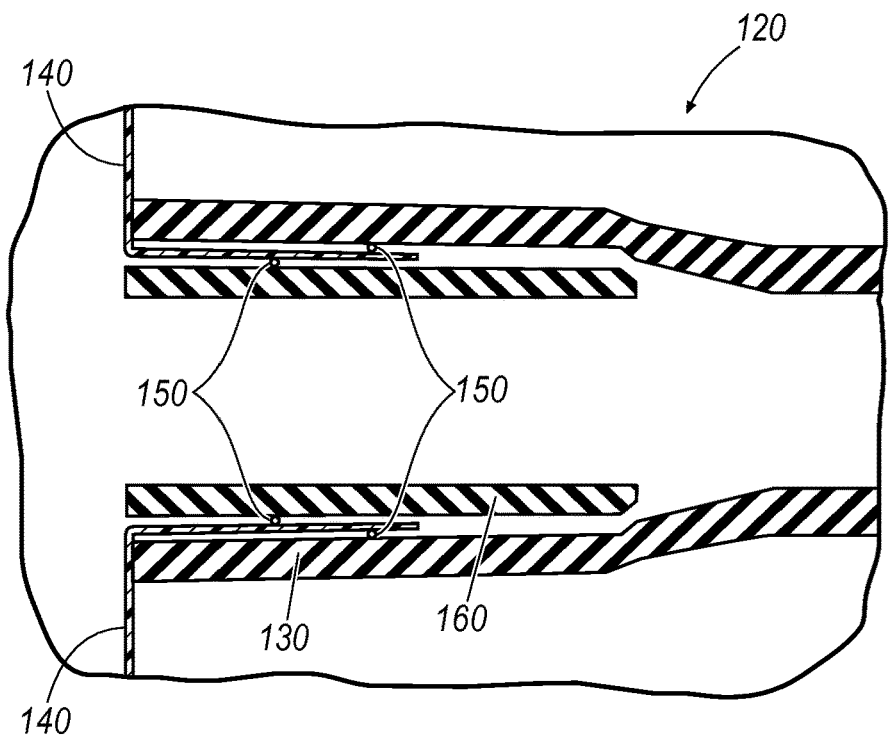
FIG. 5 illustrates an enlarged side view of another liner assembly having a tube, a liner, and a cuff, for example, without a flange.

The liner assembly 120 may be configured to provide a seal between the liner 140 and the tube 130, for example, using cuff 160. Cuff 160 may include a unitary or one piece component configured to secure the liner 140 and tube 130 together. The liner assembly 120, using the cuff 160, may utilize an interlock such as a friction interlock. The interlock may provide a permanent or tamper-resistant connection between any portions of liner assembly 120, for example, being destroyed in response to disassembly as a safety feature. For example, the liner 140 and the tube 130 may be connected with the interlock. To provide this seal, the cuff 160, such as a circular spacer with or without a flange, may be positioned inside the tube 130 thereby outwardly expanding a diameter of an inner surface of the tube 130. The liner 140 may be positioned between the tube 130 and liner 140. Thus, the cuff 160 may outwardly push the liner 140 against an inside surface of the tube 130 thereby providing a seal such as a liquid tight seal. As a result, the cuff 160 provides a unitary or one piece component that secures the liner 140 relative to the tube 130 thereby eliminating unnecessary components. Accordingly, the interlock may provide a fluid tight structure or seal thereby reducing leakage of liquid along the liner assembly 120 and may provide a permanent or tamper-resistant connection between the cuff 160, liner 140, and tube 130 that may not be removed without at least partially destroying at least a portion of the liner 140. Referring to FIGS. 3 and 5, the liner assembly 120 may include the liner 140 interposed between the tube 130 and the cuff 160. The cuff 160 may include an inner surface having a passage for receipt of liquid from the liner 140 and an outer surface that is dimensioned and configured to be received in and outwardly stretch an inner surface of the tube 130. The cuff 160 may be configured to be positioned with an axial force along the tube 130 and may be configured to expand the tube 130 thereby placing an outward force against the liner 140 and toward the inner surface of tube 130. In reaction, the tube 130 may place an inward force against the liner 140 and toward the outer surface of the cuff 160. Thus, the liner assembly 120 may be cold-formed with the axial force, outward force, inward force, or a combination thereof, thereby creating an interlock between the tube 130, liner 140, and cuff 160. Accordingly, the liner 140 may be held between the tube 130 and the cuff 160 thereby providing a permanent or tamper-resistant connection between the cuff 160, liner 140, and tube 130 that may not be removed without at least partially destroying at least a portion of the liner 140.

The liner assembly 120 may be configured for a permanent or tamper-resistant connection between tube 130, liner 140, and cuff 160, for example, being at least partially destroyed in response to disassembly. For example, the liner assembly 120 (e.g., liner 140 and/or tube 130) may be configured to at least partially destruct, rip or tear in the event of disassembly thereby providing a permanent or tamper-resistant liner assembly 120 in response to disassembly. Alternatively, the tube 130, liner 140, and cuff 160 may be connected using an interlock such as an adhesive or heat seal thereby providing a permanent or tamper-resistant liner assembly 120, for example, being at least partially destroyed in response to disassembly. In addition, liner assembly 120 may utilize any other destructive interlock between the tube 130, liner 140, and cuff 160 that results in at least partial destruction of at least one of the tube 130, liner 140, and cuff 160 during disassembly. Thus, the liner assembly 120 may be configured to provide a permanent or tamper-resistant connection, for example, being at least partially destroyed in response to disassembly.

Figure 4:
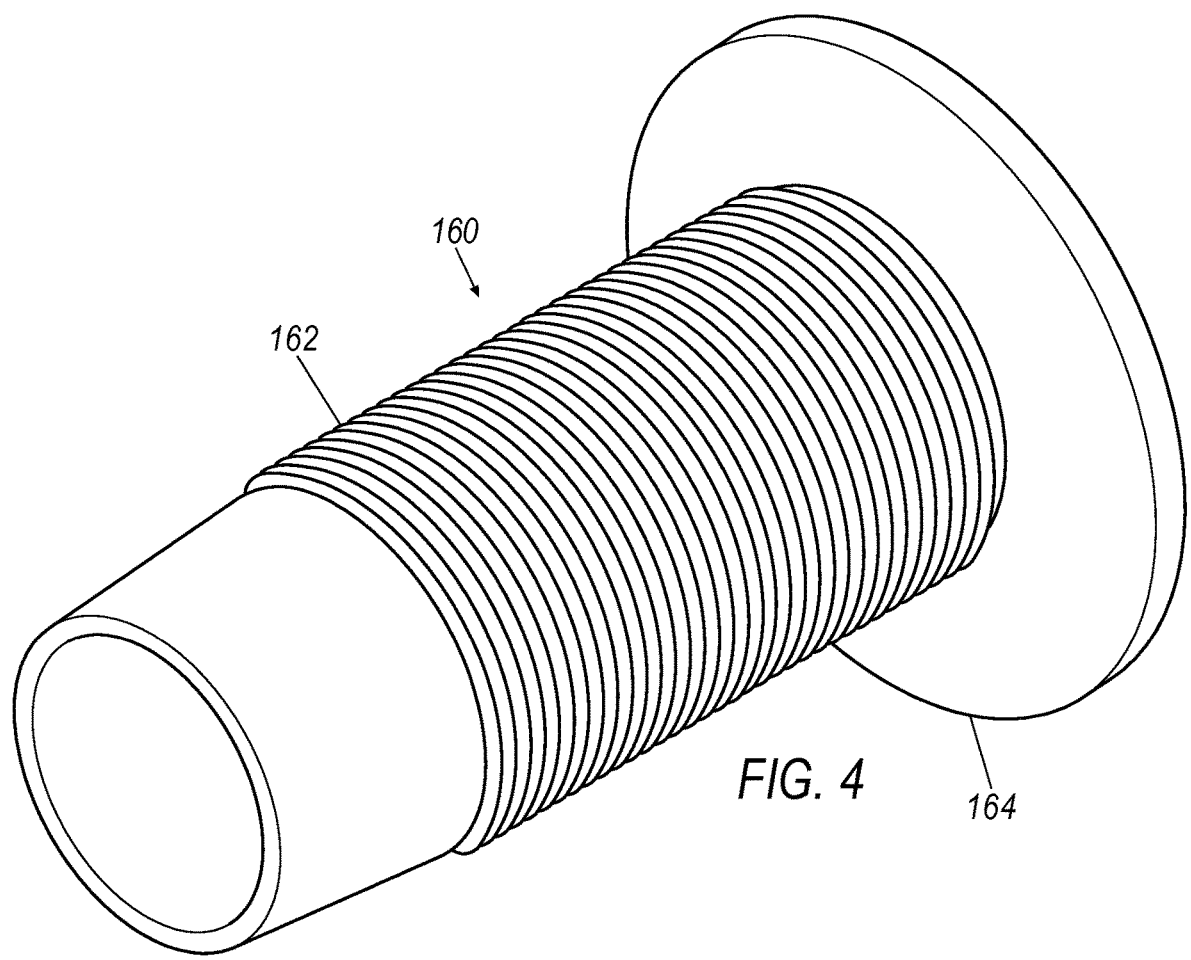
FIG. 4 illustrates an enlarged perspective view of a friction cuff, for example, with a flange.
Figure 6:
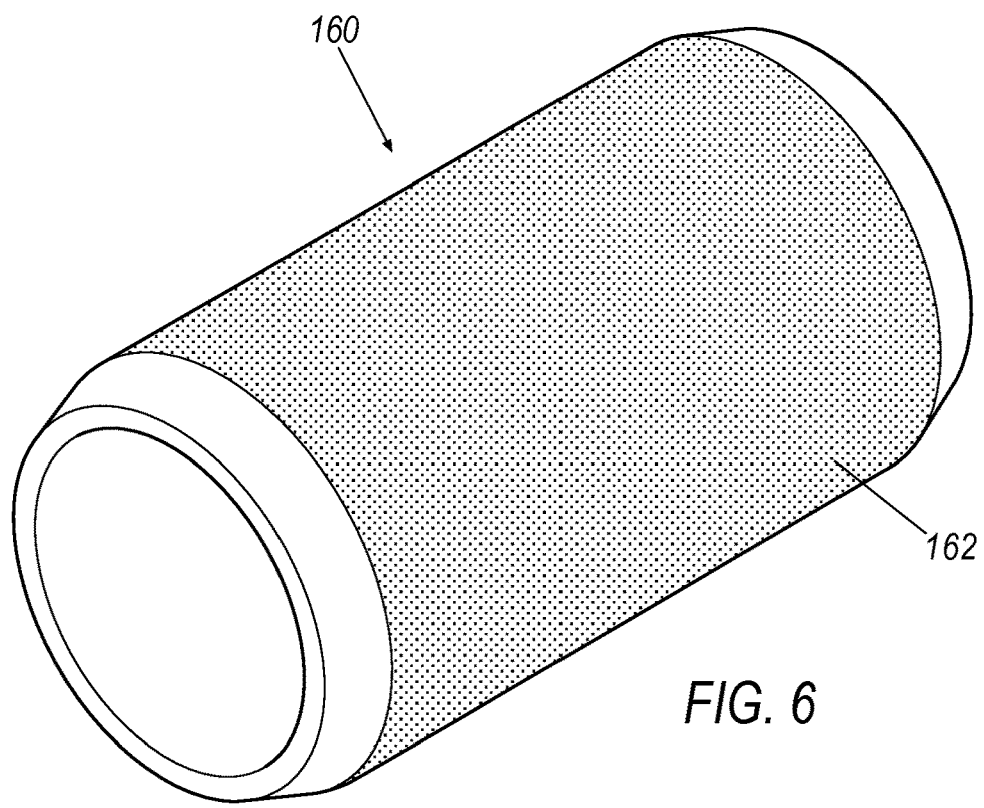
FIG. 6 illustrates an enlarged perspective view of another cuff, for example, without a flange.

The liner assembly 120 may include the cuff 160 with a flange 164 as shown in FIG. 4 or without a flange 164 as shown in FIG. 6. The cuff 160 may include a rigid cuff, for example, configured to resist bending of the flange 164 and maintain a passage therethrough. Further, the flange 164 may be configured to maintain the liner 140 in an outward position relative to the tube 130, for example, to resist blockage of the passage of the cuff 160. To maintain the outward position, the flange 164 may be configured to releasably contact or push against the liner 140 or may be adhered or heat sealed thereto. Alternatively, the cuff 160 may be without a flange 164, for example, to allow relative inward movement of the liner 140.

As mentioned above, the liner 140 may be affixed (e.g., permanently) relative to the cuff 160 and tube 130. As shown in FIG. 5, the liner assembly 120 may include an optional adhesive 150 (e.g., a food grade adhesive) thereby permanently adhering the tube 130, liner 140, and cuff 160 together. Alternatively, the liner 140 may be affixed relative to the cuff 160 and tube 130 using a heat seal thereby permanently fusing the tube 130, liner 140, and cuff 160 together. By permanently fusing these components they are not intended to be separated.

As shown in FIGS. 4 and 6, the cuff 160 may include an interlock surface 162. The interlock surface 162 may be configured to provide or facilitate the interlock between the cuff 160, liner 140, and tube 130. The interlock surface 162 may include a plurality of protrusions interposed by a plurality of recesses, thereby resulting in an increased surface area and a higher coefficient of friction. For example, this may create a plurality of ridges with alternating valleys as shown in FIG. 4. As another example, the interlock surface 162 may include a plurality of pores as shown in FIG. 5. Alternatively, the interlock surface 162 may be smooth. Thus, the interlock surface 162 may facilitate the interlock and resulting seal between the cuff 160, liner 140, and tube 130.

Figure 7:
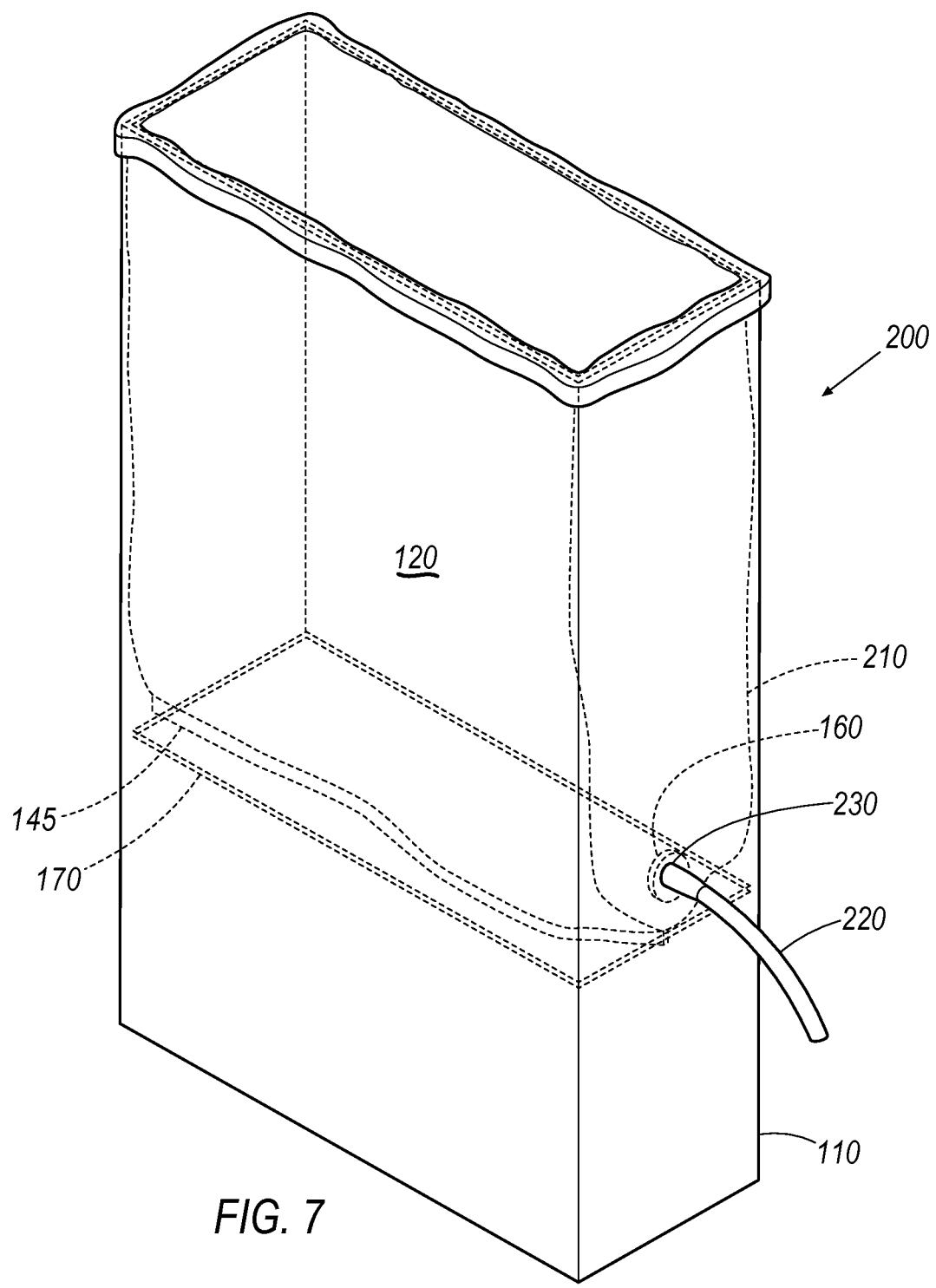
FIG. 7 illustrates a perspective view of a containment assembly having an alternative liner assembly.
Figure 8:
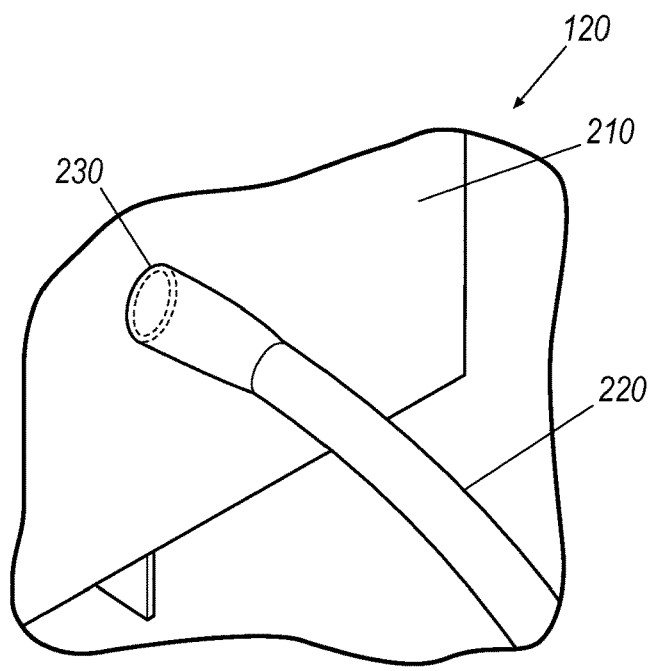
FIG. 8 illustrates an enlarged perspective view of the liner assembly of FIG. 7.
Figure 9:
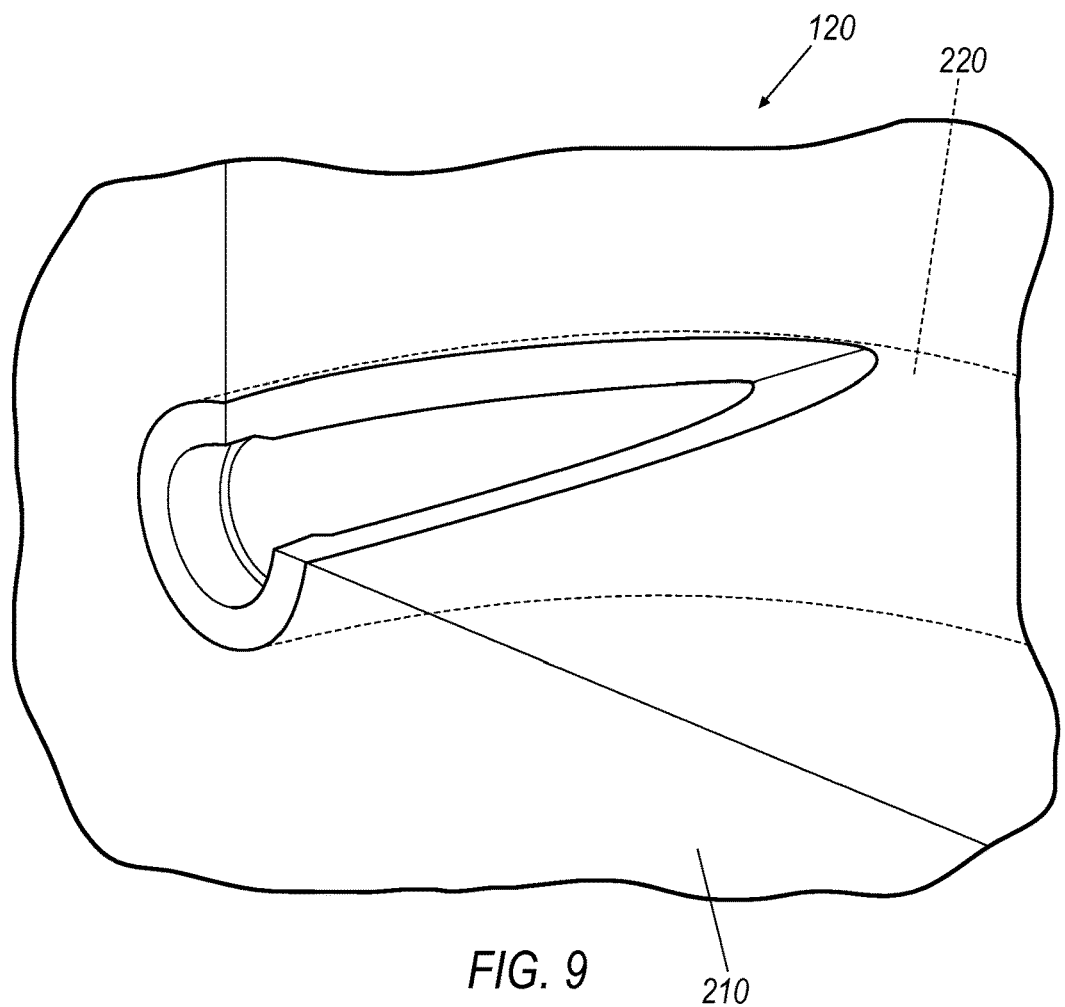
FIG. 9 illustrates another enlarged perspective view of the liner assembly of FIG. 7.
Figure 10:
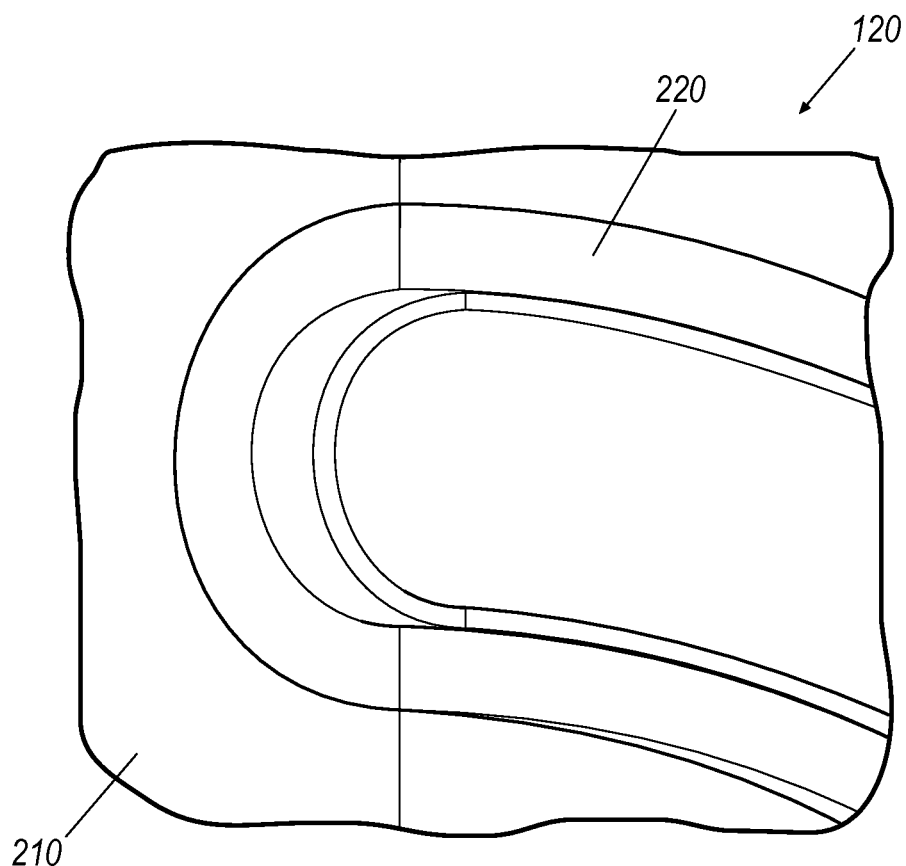
FIG. 10 illustrates another enlarged perspective view of the liner assembly of FIG. 7.

Referring to FIG. 7, the dimensions of the liner 140 are configured to allow for a minimum amount of liner material to be used for the specific vessel 110 that is being lined. This reduces the number of folds created when the liner is installed into the vessel and filled, thus improving drainage of the liquid product. The liner 140 may be constructed from a tube of flexible material having one end sealed closed. The tube 130 is attached to the liner 140, which may occur proximal to the sealed end of the liner 140 at a point configured to assist in draining the beverage product in its entirety from the liner 140. Further, the liner 140 may be dimensioned and configured to provide an optimum size to reduce material usage and improve draining with respect to the vessel 110. In addition, the liner 140 may be optimized or dimensioned according to a vessel length, a vessel height, a vessel opening perimeter or circumference, and a spigot location relative to a length and a width of the vessel 110.

The liner 140 may be made from flat tubing, gusseted tubing, or a flexible pouch having opposed sidewalls that may be optionally connected at peripheral edges. The liner 140 may include a lower portion 145 that may be cut and formed by a heat seal, e.g., thereby forming a bottom. The lower portion 145 may include a gusset as shown in FIGS. 1 and 7 or a flat edge as shown in FIG. 13, described in further detail below. The liner 140 may be any shape configured to form-fit to the vessel 110. The liner 140 may be configure to be stretched over the top edge of the vessel 110, for example, to keep the liner 140 from sliding down inside of the vessel 110 upon being filled.

Methods of manufacturing the liner 140 are contemplated. Methods may include converting raw material into roll stock and converting the roll stock into individual liners 140. The raw material may be in the form of roll stock, for example, dimensioned according to a vessel length and a vessel width of the vessel 110. The roll stock may then be converted by cutting (e.g., using heat or a cutter) the liner 140 to an optimum liner length (e.g., a vessel height of vessel 110) thereby resulting in an end open at the top of the liner 140 and a bottom of the liner 140 that is sealed.

Furthermore, methods of manufacturing and assembling the liner assembly 120 are contemplated. A method may include positioning the cuff 160 (e.g., a friction cuff) over a locating stud of an assembly tool or platform, positioning the liner 140 over at least a portion of the cuff 160 and locating stud, and pushing tubing 130 over at least a portion of the liner 140, cuff 160, and locating stud, thereby outwardly expanding the tube 130 and puncturing the liner 140. In use, puncturing the liner 140 allows fluid to flow from the liner 140 through the cuff 160, and into the tube 130. As such, the tube 130, liner 140, and cuff 160 are held together (e.g., permanently) by an inward force from the elasticity of the tube 130 and a friction force between the tube 130, liner 140, and cuff 160. Alternatively or in addition, any or all of tube 130, liner 140, and cuff 160 may be held together (e.g., permanently) using an interlock such as an adhesive or a heat seal therebetween. Accordingly, the liner assembly 120 may be configured with layers having an order from inside to outside as follows: the cuff 160 (e.g., a friction cuff), the liner 140, and the tubing 130 (e.g., flexible tube). In addition, a method may further include removing the liner assembly 120 from the assembly tool or platform and packing the liner assembly 120 for distribution.

Referring to FIGS. 7-10, an assembly 200 may include a vessel 110 and a liner assembly 120. The vessel 110 may include a support surface 170. The liner assembly 120 may include a liner 210 (e.g., a fitted flexible liner), a tube 220 (e.g., a flexible tubing), and a heat seal 230. The liner 210 may include a single piece heat sealed liner dimensioned and figured for the vessel 110. The liner 210 may be directly attached to a tube 220 with the heat seal 230. The heat seal 230 may provide a permanent or tamper-resistant connection, for example, being at least partially destroyed in response to disassembly. The heat seal 230 may be created by using a heat probe. The heated probe may push the liner 210 into an inner surface of the tube 220 thereby sealing an outer surface of the liner 210 at the point at which the liner 210 contacts the inner surface and end of the tube 220. Liner 210 and tube 220 may be interchangeable with liner 140 and tube 130, respectively.

The liner 210 may be dimensioned and configured to allow for a minimum amount of liner material to be used for the specific vessel 110 being lined. This may reduce the number of folds created when the liner 210 is installed into the vessel 110 and filled, thus improving drainage of the liquid or product. The liner 210 may be constructed from a tube 220 of flexible material having one end sealed closed.

The tube 220 and liner 210 may be permanently attached, which may occur proximal to the sealed end of the liner 210 at a point configured to assist in draining the product in its entirety from the liner 210. The liner 210 may then be placed over a locating board with heat probe for sealing. The tube 220 may then be placed above the heat probe and a foot operated pedal may then pushes the heat probe through a hole in the locating board thereby forming the heat seal 230. Accordingly, the liner assembly 120 may include the layers from inside to outside as follows: liner 210, heat seal 230, and tube 220.

Figure 11:
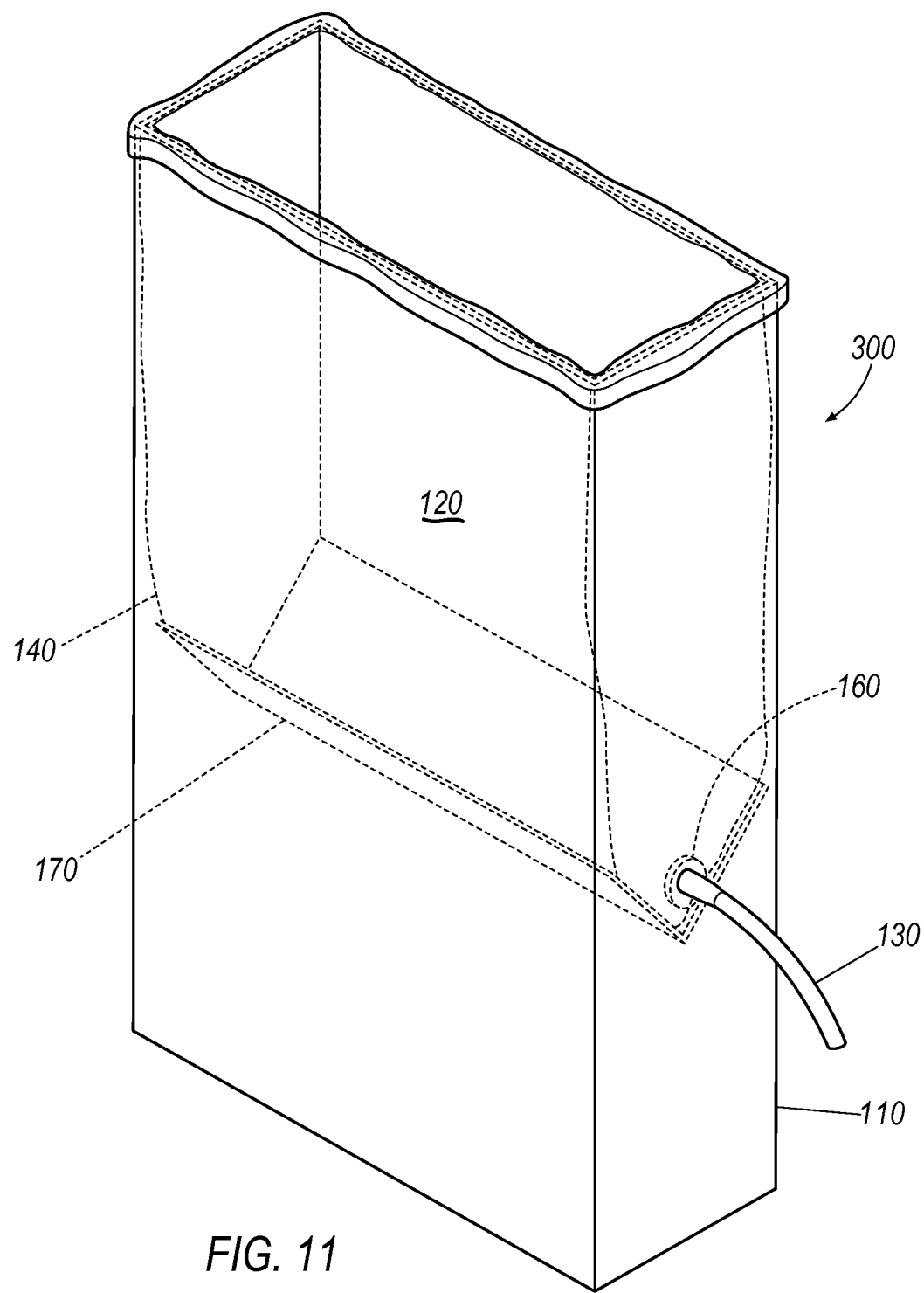
FIG. 11 illustrates a perspective view of an alternative containment assembly.
Figure 12:
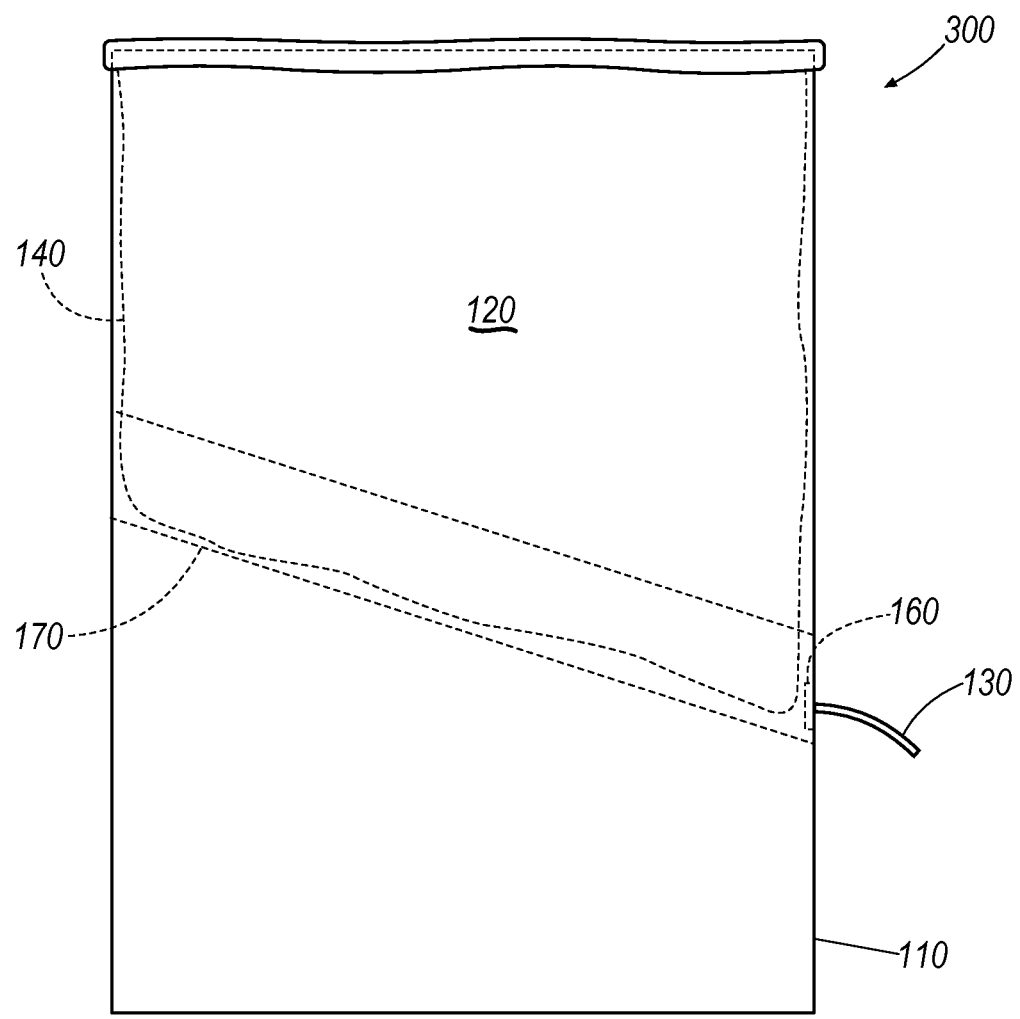
FIG. 12 illustrates a side view of an alternative containment assembly.

Referring to FIGS. 11 and 12, an assembly 300 may include the vessel 110 and the liner assembly 120 The liner 140, the vessel 110, or both the liner 140 and vessel 110 may be configured with a tapered structure, for example as a bottom of the liner 140 and/or the support surface 170 of the vessel 110. For example, the tapered structure may optimize utilization of fluid in the liner 140 by urging fluid toward the tube 130. The tapered structure may include any structure configured to urge liquid toward the tube 130 of the liner assembly 120 and/or spigot of the vessel 110. The tapered structure may include any number of tapered surfaces as part of the vessel 110 or liner 140 that are configured to angle or slope liquid toward the spigot of the vessel 110. The tapered structure may include two tapered surfaces forming a v-shape (e.g., along a lengthwise, central axis of the vessel 110) as shown in FIG. 11, may be tapered downwards from a first end (e.g., a backend) to a second end (e.g., a front end) of the vessel 110 as shown in FIG. 12, or may be a combination thereof. For example, the bottom of liner 140 or the support surface 170 of vessel 110 may include the tapered structure. Moreover, the liner 140 may have any number of gussets or may be heat sealed to form a tapered structure as shown in FIGS. 11 and 12. As such, the vessel 110 and liner 140 may be configured to taper fluid out of the liner 140 and toward the tube 130 thereby optimizing usage of the fluid.

Figure 13A:
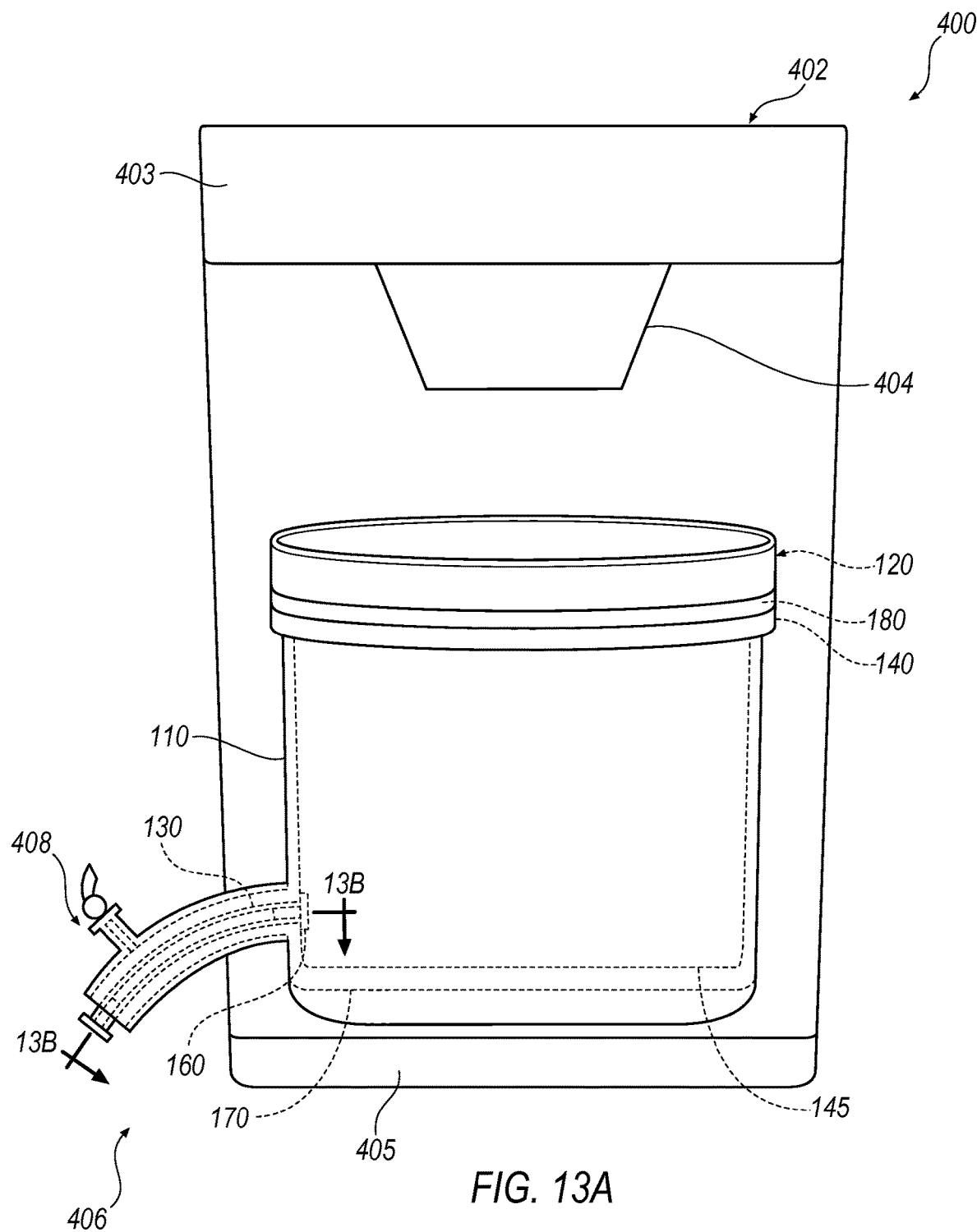
FIG. 13A illustrates a front view of a system of the present disclosure.
Figure 13B:
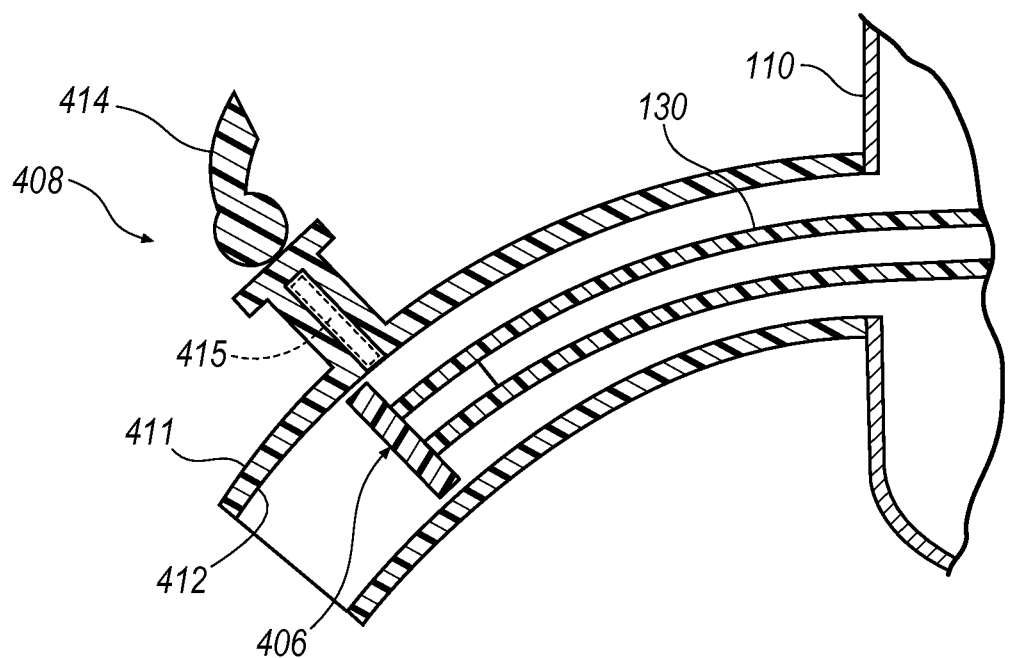
FIG. 13B illustrates a cutaway view of the system of FIG. 13A.

Referring to FIGS. 13A-B, a beverage system 400 may include a beverage maker 402, vessel 110, and liner assembly 120. The beverage maker 402 may include a tea or coffee maker. The beverage maker 402 may include a fluid source 403 configured to dispense or heat fluid such as water, a filter portion 404 configured to pass the fluid through a flavor source such as tea leaves or coffee beans (e.g., ground), and a base portion 405 configured to provide support for and position the brewing portion 402 and filter portion 404 over the vessel 110. The liner assembly 120 may be received in and folded over the vessel 110, e.g., to receive fluid in the form of tea or coffee or other beverage.

As shown in FIG. 13B, the vessel 110 may include a spigot 408. The spigot 408 may have a spigot passage 412 dimensioned to receive tube 130. The spigot 408 may include a flow operator 414 and a pin 415. The flow operator 414 may be moved to provide a plurality of flow rates by selectively opening and closing the tube 103 in open and closed positions and any number of intermediary positions therebetween. The flow operator 414 may be operatively connected to a pin 415 to provide an obstruction force to selectively pinch or collapse the tube 130. By movement in the opposite direction, the flow operator 414 may release the tube 130, thereby allow fluid to flow for dispensing of the beverage or the tube 130 to pass therethrough for removal of the liner assembly 120.

Figure 14A:
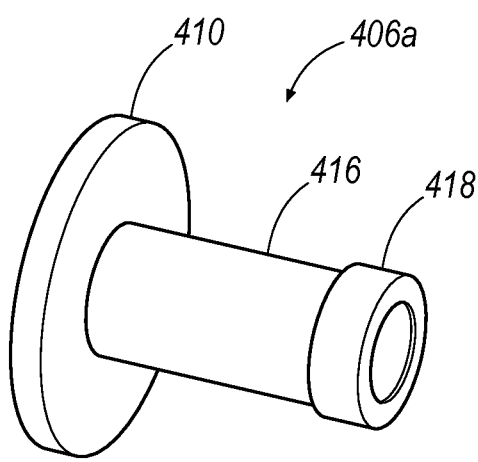
FIG. 14A illustrates an exemplary tube blocking member of the present disclosure.
Figure 14B:
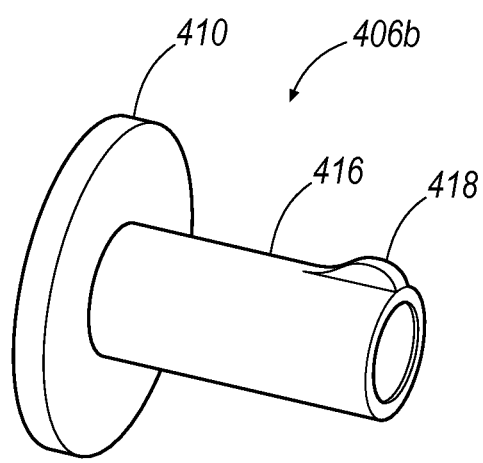
FIG. 14B illustrates an alternative tube blocking member of the present disclosure.

Referring now to FIGS. 13B, 14A and 14B, the liner assembly 102 may include a blocking member 406. The blocking member 406 may be selectively received in the tube 130 to block fluid flow (e.g., to move or store the liner assembly 102) and selectively removed from the tube 130 to allow fluid flow (e.g., to dispense a beverage). The blocking member 406 may include a head 410 configured to pass though spigot passage 412 and provide a seal relative to the tube 130. The blocking member 406 may further include a shaft 416 and a leading end 418 configured to provide an outward force relative to the tube 130, thereby securing the blocking member 406 relative to the tube 130. The blocking member 406 may include a leading end 418 with a circumferential extrusion such as a band or ridge about the shaft 416 as shown in FIG. 14A or a pointed extrusion such as a prong as shown in FIG. 14B.

Figure 15A:
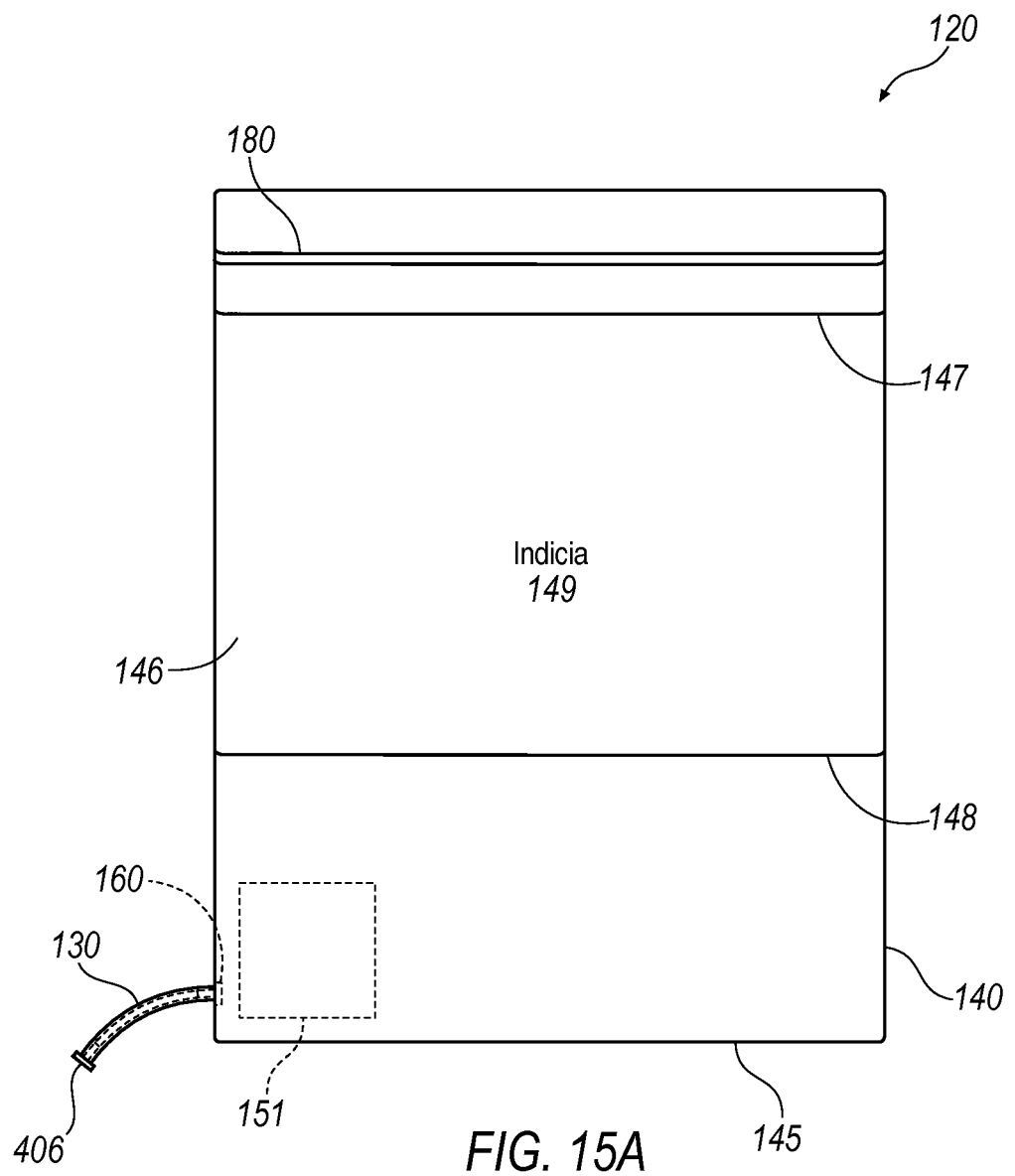
FIG. 15A illustrates a front view a liner assembly, for example, with an integrated closure mechanism in a closed configuration.
Figure 15B:
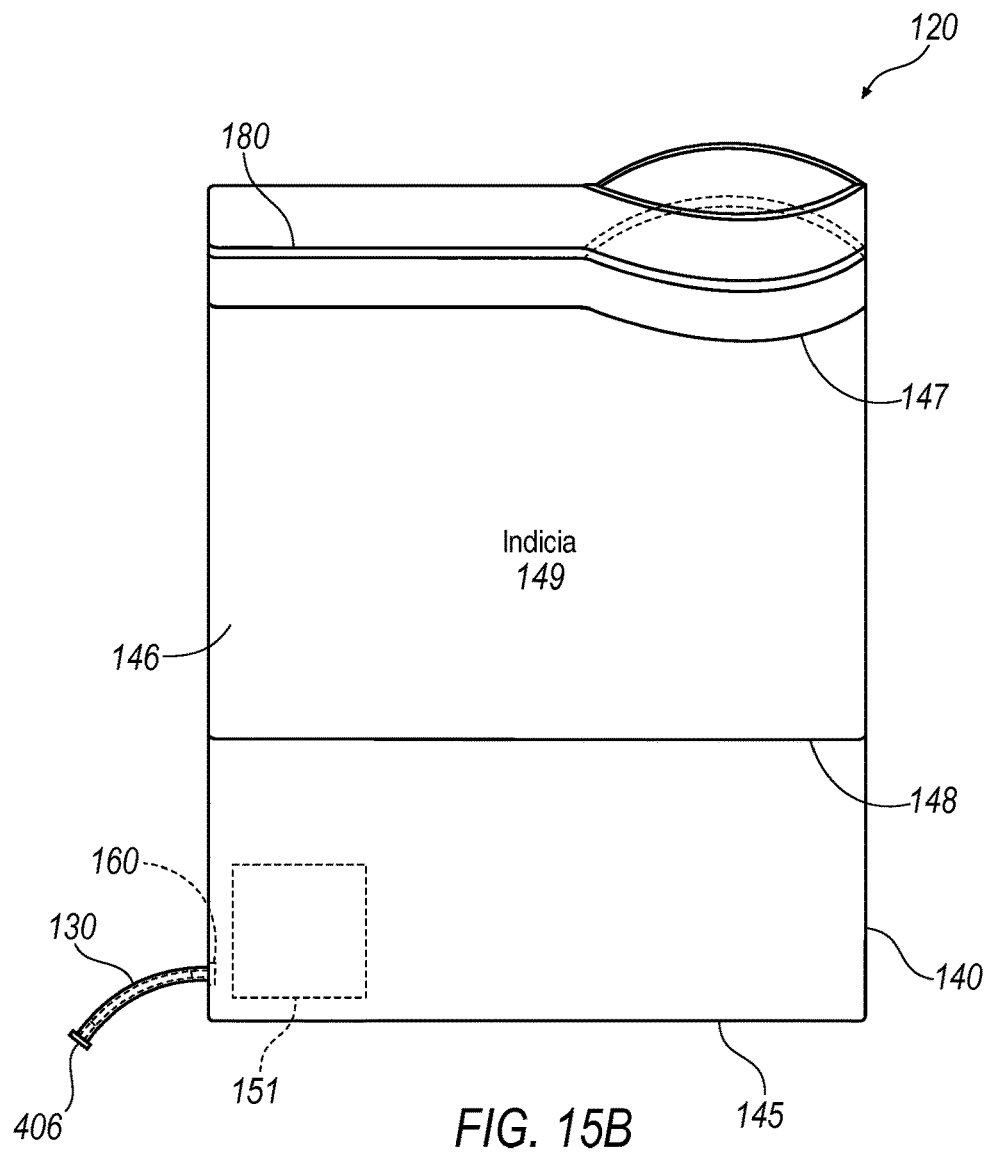
FIG. 15B illustrates the liner of assembly of FIG. 15A, for example, in an open configuration.
Figure 16A:
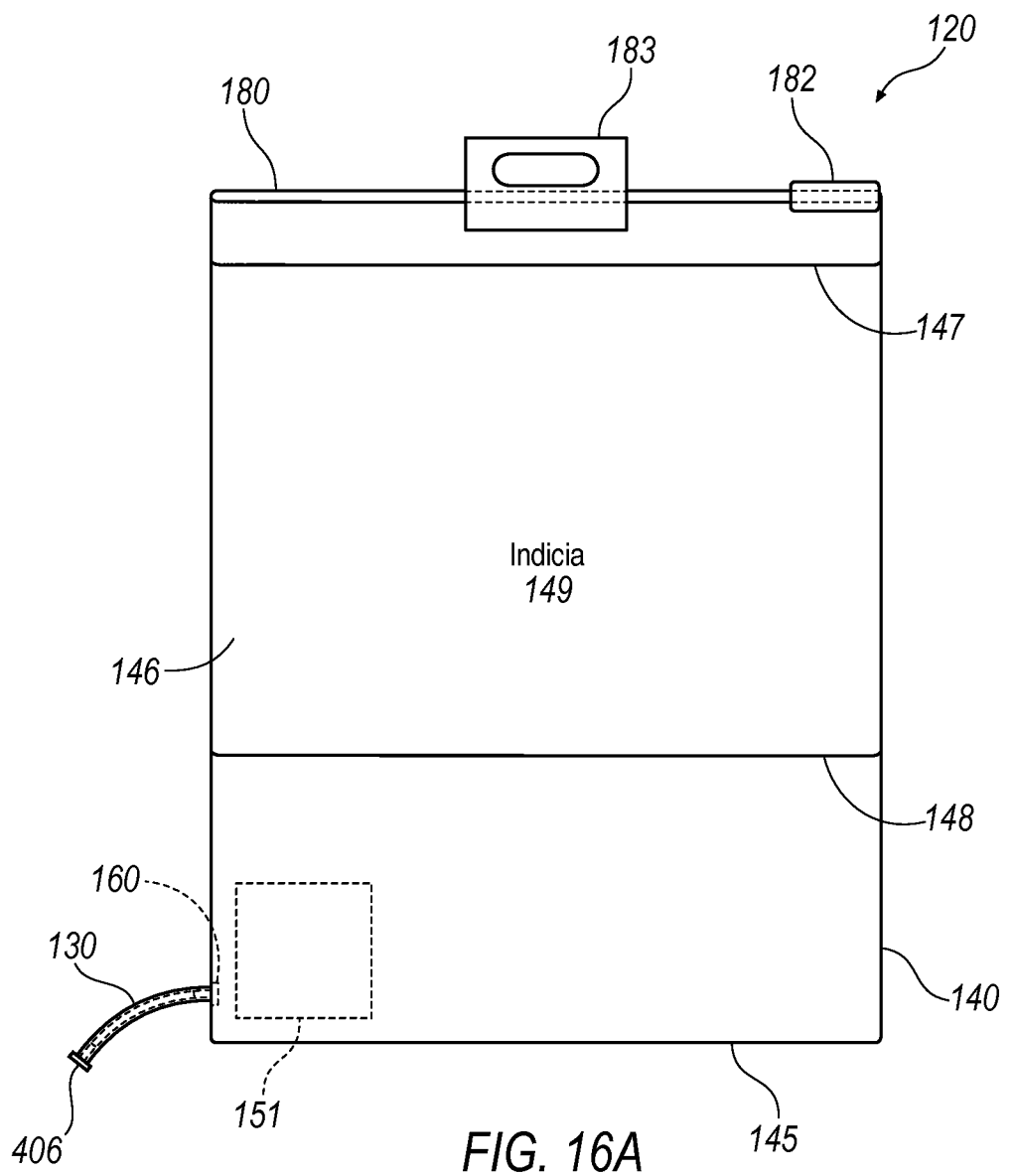
FIG. 16A illustrates a perspective view of an alternative liner assembly, for example, having an integrated closure mechanism with a slide lock in a closed configuration.
Figure 16B:
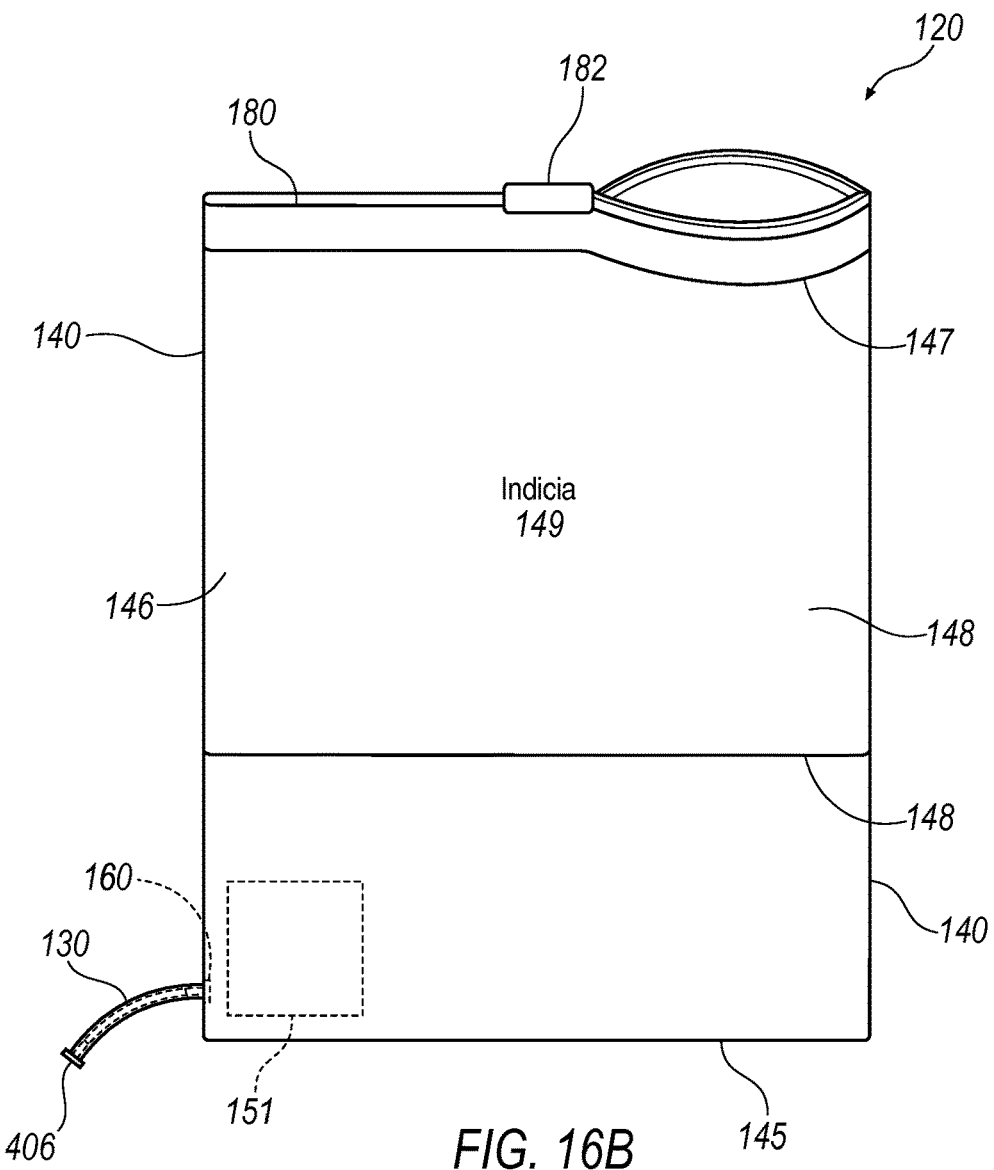
FIG. 16B illustrates a perspective view of the liner assembly of FIG. 16A, for example, in an open configuration.

Referring to FIGS. 15A-B and 16A-B, the liner assembly 120 may be configured to selectively sealed. The liner assembly 120 may include an integrated closure mechanism 180 having first and second portions providing an interlock along an upper portion the liner assembly 120, e.g., a top opening of the liner assembly 120. The integrated closure mechanism 180 may be configured to selectively seal first and second portions of the liner assembly 120 relative to each other, e.g., using interlocking ridges along the integrated closure mechanism 180 to provide a liner seal. As shown in FIG. 15A, the integrated closure mechanism 180 may provide a closed configuration to seal the interior of or retain the fluid in the liner assembly 120. As further shown in FIG. 15B, the integrated closure mechanism 180 may provide a partially or entirely open configuration to provide access to the interior of or to refill fluid into the liner assembly 120. The liner assembly 120 may also include a slide lock 182 that may slide along the integrated closure mechanism 180 between a closed configuration as shown in FIG. 16A and an open configuration as shown in FIG. 16B.

The liner assembly 120 may include a compartment 151. The compartment 151 may include a woven or mesh material configured to hold a flavor source such as tea leaves or coffee beans (e.g., ground). The compartment 151 may be integral to the liner 140 or positioned in or secured relative to the liner 140. Fluid such as water may be provided in the liner assembly 120, pass through or against the compartment 151 thereby mixing the fluid and the flavor source, and pass out of the liner assembly 120 as a beverage such as tea or coffee.

Figure 15C:
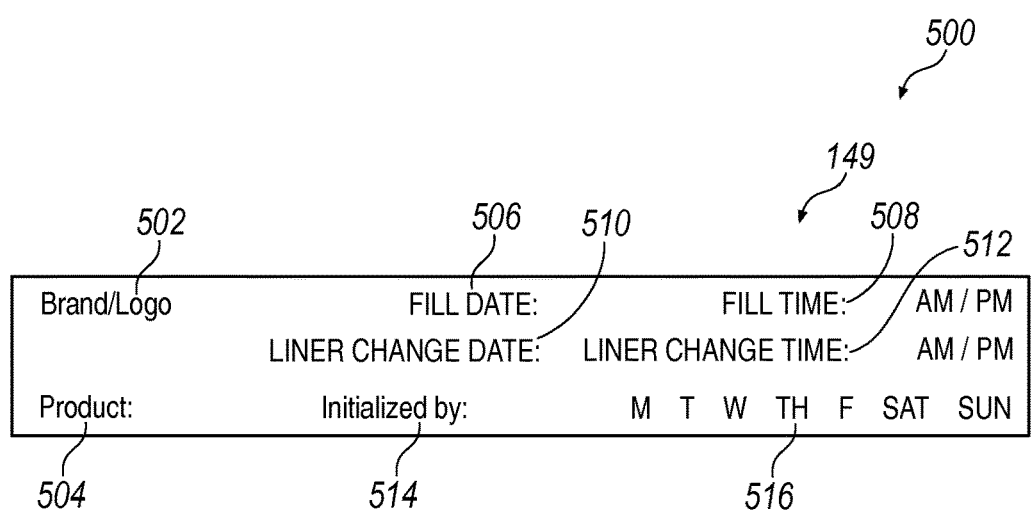
FIG. 15C illustrates exemplary indicia of the present disclosure.

The liner assembly 120 may include a label block 146 as further shown in FIG. 13. The label block 146 may extend all or any portion of the length and width of the liner 140, e.g., between an upper boundary 147 and a lower boundary 148. The label block 146 may include or may be configured to receive indicia 149. As shown in FIG. 15C, indicia 149 may include a brand/logo marker 502, product marker 504 regarding the contents such as a beverage type (e.g., a type of coffee or tea), fill date marker 506, fill time marker 508, liner change date marker 510, liner change time marker 512, initials marker 514, and day of the week marker 516, e.g., associated with preparation of the beverage or installation or manufacturing of the liner assembly 120. The label block 146 may include an opaque surface configured to be marked with indicia 149, e.g., using a printer or a writing instrument such as a pen, pencil, or marker. Thus, the block label 146 may provide information regarding the liner assembly 120 and the beverage contained therein.

The liner assembly 120 may include one or more handles 183, as shown in FIG. 16A. The handles 183 may facilitate the opening and closing of the upper portion of the liner assembly 120. The handles 183 may facilitate the removal of the liner assembly 120 from the vessel 110 and the moving and handling of liner assembly 120. Handles 183 may be integrated into liner 140. Handles 183 stamped during manufacturing of liner 140 or affixed afterwards. Handles 183 may be positioned in any orientation with respect to liner 140.

Figure 17:
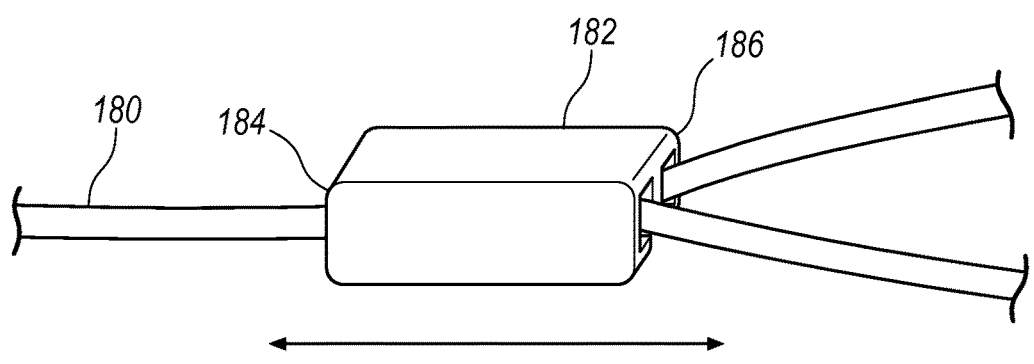
FIG. 17 illustrates a closer, perspective view of the slide lock of FIGS. 16A and 16B.

With reference to FIG. 17, the slide lock 182 a unitary or a multi-component body. The slide lock 182 may include a closing end 184 and an opening end 186. The closing end 184 may apply an inward force to urge the integrated closure mechanism 180 together when the slide lock 182 is moved in the direction of the closing end 184. The opening end 186 may apply an outward force to separate the integrated closure mechanism 180 when the slide lock 182 is moved in the direction of the opening end 186. Thus, the integrated closure mechanism 180 may selectively seal the liner assembly 120 depending on the position of the slide lock 182.

Figure 18:
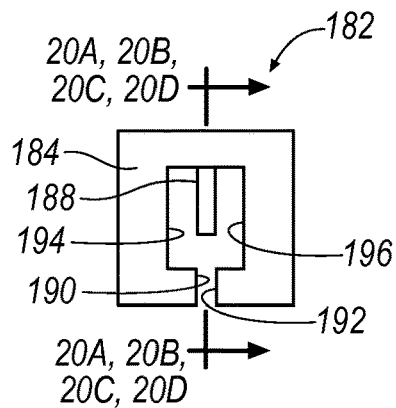
FIG. 18 illustrates a back view of the slide lock of FIG. 17.
Figure 19:
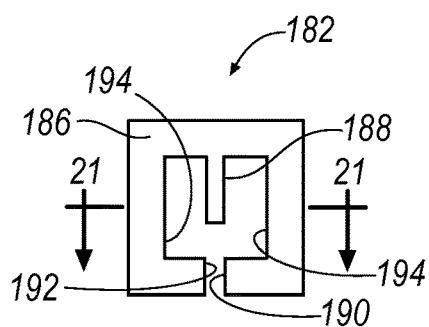
FIG. 19 illustrates a front view of the slide lock of FIG. 17.
Figure 20A:
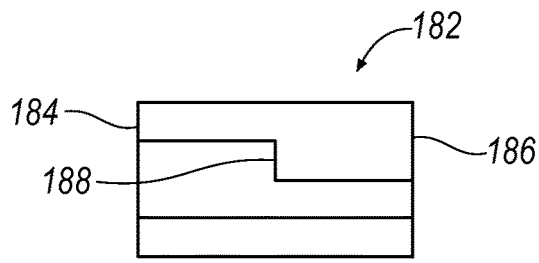
FIG. 20A illustrates a vertical section view of a slide lock of FIG. 18.
Figure 20B:
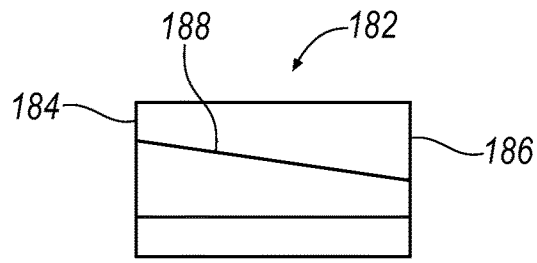
FIG. 20B illustrates a vertical section view of an alternative slide lock of FIG. 18.
Figure 20C:
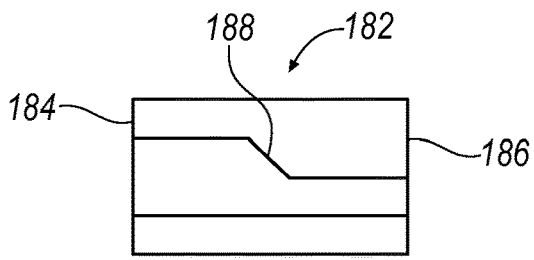
FIG. 20C illustrates a vertical section view of an alternative slide lock of FIG. 18.
Figure 20D:
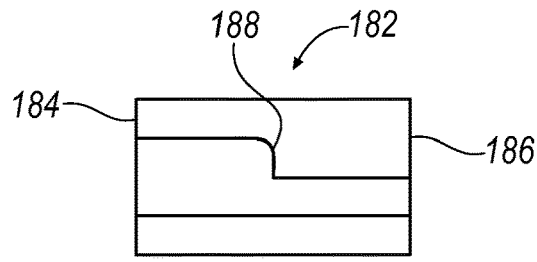
FIG. 20D illustrates a vertical section view of an alternative slide lock of FIG. 18.
Figure 21:
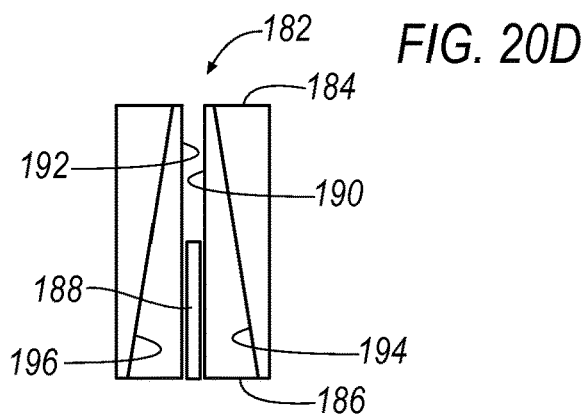
FIG. 21 illustrates a horizontal section view of a slide lock of FIG. 19.

Referring to FIGS. 18-21, the slide lock 182 may include features to facilitate the inward and outward forces. As shown in FIGS. 18-19, the slide lock 182 may include a divider 188, e.g., to separate and provide the outward force to separate the integrated closure mechanism 180, and may include lower arms 190, 192, e.g., to provide an inward force on the liner 140 and to slide against and facilitate closure of the portions of liner 140 that are adjacent to integrated closure mechanism 180. The divider 188 may include any profile configured to selectively separate the integrated closure mechanism 180, e.g., a right angle step profile as shown in FIG. 20A, a tapered ramp profile as shown in FIG. 20B, a tapered step profile as shown in FIG. 20C, a curved step profile as shown in FIG. 20D, or a combination thereof. As shown in FIG. 21, the slide lock 182 may include sidewalls 194, 196, e.g., to provide the inward force to the integrated closure mechanism 180, and may taper outwards from the closing end 184 to the opening end 186, e.g., to facilitate the inward force and closure at the closing end 184 and the outward force and separation at the opening end 186.

The slide lock 182 may be configured to provide safety or tamper-resistant features. For example, the slide lock 182 may include a first loop member and the liner 140 may have a second loop member, adjacent the slide lock 182 when in the closed configuration. The first and second loop members may be secured relative to each other in the closed position with a lock or a one-way zip tie through the first and second loop members. The lock or zip tie may be cut or otherwise removed to provide the open configuration. Thus, tamper resistance may be provided by the slide lock 182.

Figure 22A:
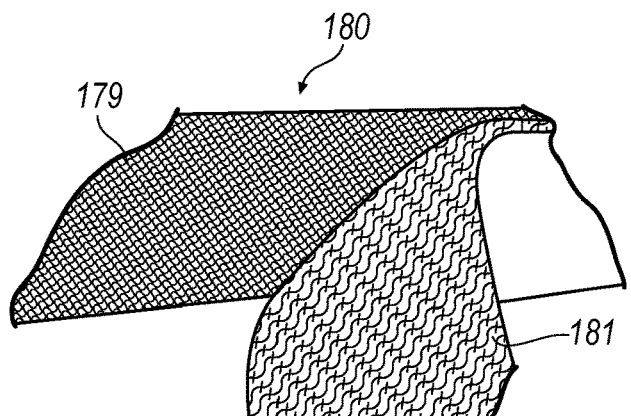
FIG. 22A illustrates another integrated enclosure mechanism, e.g., using a hook and loop fastener.
Figure 22B:
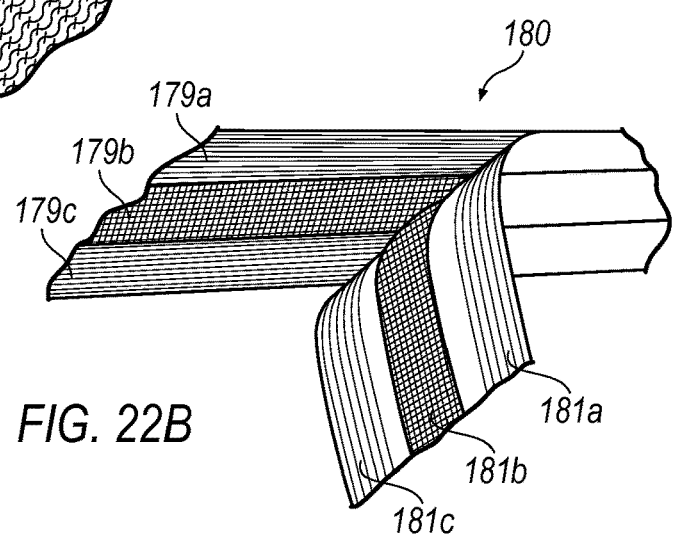
FIG. 22B illustrates another integrated closure mechanism, e.g., having a plurality of interlocks.

With reference to FIGS. 22A and 22B, the integrated closure mechanism 180 may be a hook and loop type fastener. As shown in FIG. 22A, the integrated closure mechanism 180 may include a first portion 179 configured to selectively receive and release a second portion 181, thereby providing a seal therebetween. As shown in FIG. 22B, the integrated closure mechanism 180 may include a plurality of the same or different types of closure mechanism. For example, the integrated closure mechanism 180 may include a hook and loop fastener with first portion 179B and second portion 181B disposed between the interlocking ridges of first portion 179A and second portion 181A and the interlocking ridges of first portion 179C and second portion 81C. Thus, any combination of integrated closure mechanisms may provide one or more seals.

Figure 23:
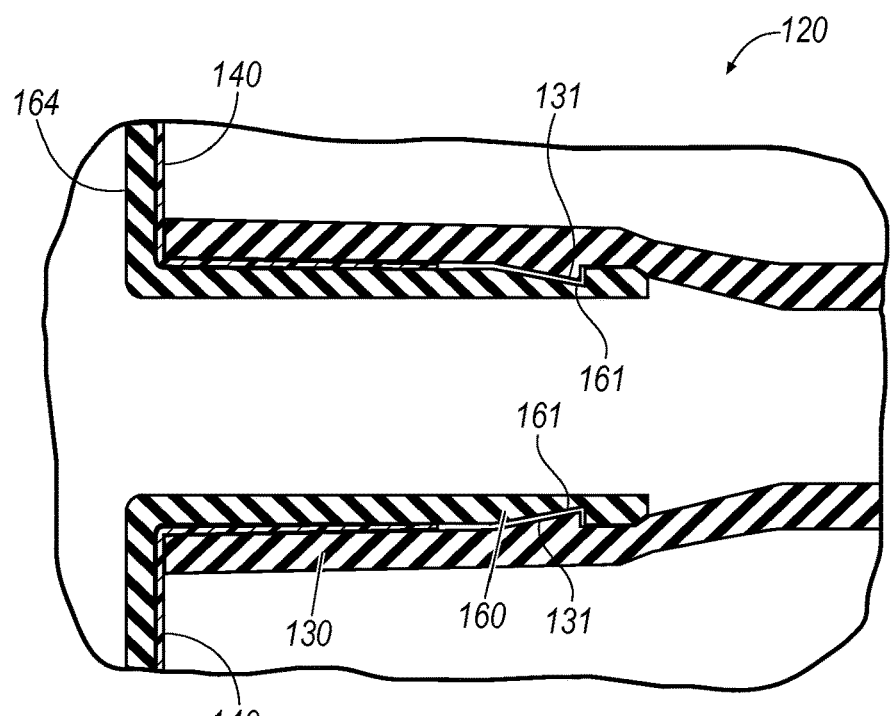
FIG. 23 illustrates an enlarged side view of an alternative liner assembly.

Referring to FIG. 23, the liner assembly 120 may be configured to fail in the event of disassembly. For example, the tube 130 may include a protrusion 131 and the cuff 160 may include a recess 161, thereby forming a mechanical interlock that allows movement in a first longitudinal direction for assembly but obstructs movement in a second longitudinal direction to obstruct or fail in the event of disassembly. Alternatively or in addition, a cross-section of the cuff 160, liner 140, and/or tube 130 may have a plastic strain or failure stress capacity (e.g., in a longitudinal or torsional direction) that is less than a plastic strain or failure stress capacity of the interlock, e.g., a mechanical interlock or a chemical interlock such as an adhesive. The mechanical interlock may also include a smooth surface, a textured surface, a barbed surface, a press fit connection, or fish hook type connection between the mating surfaces between any or all of the cuff 160, liner 140, and tube 130, e.g., such that an outer diameter of the cuff 160 may be positioned into an inner diameter of the tube 130 so as to provide frictional or obstructive binding therebetween. Thus, in response to disassembly, the liner assembly 120 may fail, thus providing tamper resistance.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A beverage system comprising:
    a beverage maker;
    a vessel with a flow operator configured to provide a plurality of flow rates;
    a liner assembly configured to be positioned within at least a portion of the vessel, the liner assembly including:
    a liner having an upper portion and a lower portion,
    an integrated closure mechanism on the upper portion,
    a slide lock having a divider spanning from a closing end to an opening end that is configured to selectively separate the integrated closure mechanism,
    a flexible tube on the lower portion, and
    a cuff having an interlock surface and a planar contact surface,
    wherein the cuff is received in at least a portion of the flexible tube thereby outwardly expanding the liner and stretching the flexible tube to secure the liner against the planar contact surface of the cuff and against an internal portion of the interlock surface of the flexible tube,
    wherein the liner contacts and extends along the planar contact surface,
    wherein the cuff, liner and flexible tube are in a concentric, overlapping arrangement while providing a passage through the cuff,
    wherein the interlock surface provides a first seal between at least the cuff and the liner, and
    wherein the integrated closure mechanism provides a second seal at an upper portion of the liner.

2. The system of claim 1, wherein the cuff is configured to apply an outward force to the liner to cause the outward expansion of the liner adjacent the planar contact surface and the stretching of the flexible tube, and the flexible tube is configured to apply an inward force to the liner, thereby directly securing the cuff, liner and flexible tube together in the concentric, overlapping arrangement to form a unitary component.

3. The system of claim 1, wherein the interlock surface is configured to provide a permanent connection between the cuff, liner, and flexible tube that is at least partially destroyed in response to disassembly and
   wherein the interlock surface includes at least one of a smooth surface, a textured surface, a barbed surface, a press fit connection, and fish hook type connection.

4. The system of claim 1, wherein the cuff and liner are positioned in the flexible tube such that a proximal end of the flexible tube is enlarged relative to a distal end of the flexible tube, the cuff includes a flange with the planar contact surface configured to maintain the liner in an outward position, in a substantially planar direction, to resist obstruction of the flexible tube, and the liner includes an integrated woven or mesh compartment configured to hold a flavor source.

5. The system of claim 1, wherein the interlock surface includes a plurality of ridges.

6. The system of claim 1, wherein the interlock surface is secured relative to the liner with at least one of an adhesive and a heat seal.

7. The system of claim 1, wherein at least one of the vessel and the liner includes a tapered structure with at least two tapered surfaces converging along a longitudinal axis to urge fluid toward the flexible tube.

8. A liner assembly comprising:
   a cuff having an interlock surface and a planar contact surface;
   a liner with an integrated closure mechanism and being positionable over at least a portion of the cuff; and
   a flexible tube that is positionable over at least a portion of the liner and cuff;
   wherein the cuff is received in at least a portion of the flexible tube thereby outwardly expanding the liner and stretching the flexible tube to secure the cuff, liner and flexible tube together while providing a passage through the cuff, and
   wherein the liner contacts and extends along the planar contact surface.

9. The assembly of claim 8, wherein the cuff is configured to apply an outward force to the liner to cause the outward expansion of the liner adjacent the planar contact surface and the stretching of the flexible tube, and the flexible tube is configured to apply an inward force to the liner, thereby directly securing the cuff, liner and flexible tube together in a concentric, overlapping arrangement to form a unitary component.

10. The assembly of claim 8, wherein the interlock surface is configured to provide a permanent connection between the cuff, liner, and flexible tube that is at least partially destroyed in response to disassembly and
   wherein the interlock surface includes at least one of a textured surface, press fit, and fish hook type connection.

11. The assembly of claim 8, wherein the cuff and liner are positioned in the flexible tube such that a proximal end of the flexible tube is enlarged relative to a distal end of the flexible tube, and the cuff includes a flange with the planar contact surface configured to maintain the liner in an outward position, in a substantially parallel direction, to resist obstruction of the flexible tube.

12. The assembly of claim 8, wherein the interlock surface includes at least a smooth portion.

13. The assembly of claim 8, wherein the interlock surface includes a plurality of ridges.

14. The assembly of claim 8, wherein the interlock surface is secured relative to the liner with at least one of an adhesive and a heat seal.

15. A method of using a beverage system, the method comprising:
   positioning a liner assembly in a vessel, the liner assembly having a liner with an upper portion and a lower portion, the liner assembly including an integrated closure mechanism on the upper portion, a slide lock having a divider spanning from a closing end to an opening end that is configured to selectively separate the integrated closure mechanism, and a flexible tube extending from and secured relative to the lower portion with a cuff having an interlock surface and a planar contact surface, wherein the cuff is received in at least a portion of the flexible tube thereby outwardly stretching the flexible tube to secure the cuff, liner, and flexible tube, and wherein the liner contacts and extends along the planar contact surface;
   positioning the liner assembly relative to a beverage maker;
   passing fluid from the beverage maker into the liner assembly;
   positioning a blocking member in the flexible tube; and
   sealing the integrated closure mechanism.

16. The method of claim 15, wherein the cuff is configured to apply an outward force to the liner to outwardly expand the liner adjacent the planar contact surface and cause the stretching of the flexible tube, and the flexible tube is configured to apply an inward force to the liner, thereby directly securing the cuff, liner and flexible tube together in a concentric, overlapping arrangement to form a unitary component.

17. The method of claim 15, wherein the interlock surface is configured to provide a permanent connection between the cuff, liner, and flexible tube that is at least partially destroyed in response to disassembly and
   wherein the interlock surface includes at least one of a textured surface, press fit, and fish hook type connection.

18. The method of claim 15, wherein the cuff and liner are positioned in the flexible tube such that a proximal end of the flexible tube is enlarged relative to a distal end of the flexible tube, the cuff includes a flange with a planar surface configured to maintain the liner in an outward position, in a planar direction, to resist obstruction of the flexible tube.

19. The method of claim 15, wherein the interlock surface includes at least a smooth portion.

20. The method of claim 15, wherein the interlock surface includes at least one of a plurality of ridges configured to interlock the cuff against the liner and the flexible tube.

21. A liner assembly comprising:
   a cuff including a planar contact surface, an outer surface, an inner surface and a passage therethrough;
   a liner with a closure mechanism and being positionable over at least a portion of the outer surface; and
   a flexible tube that is positionable over at least a portion of the liner and the outer surface,
   wherein the cuff is received in at least a portion of the flexible tube thereby outwardly stretching the flexible tube to secure the cuff, liner and flexible tube together while providing the passage through the inner surface, and
   wherein the liner contacts and extends along the planar contact surface.

22. A method of a liner assembly, comprising:
   providing a tubular member having a planar contact surface, an outer surface, an inner surface and a passage therethrough;
   providing a liner with an integrated closure mechanism;

positioning the liner over at least a portion of the outer surface of the tubular member; and positioning a flexible tube over at least a portion of the liner and the outer surface of the tubular member such that the liner contacts and extends along the planar contact surface; and receiving the tubular member in at least a portion of the flexible tube thereby outwardly stretching the flexible tube to secure the tubular member, liner and flexible tube together while providing the passage through the inner surface of the tubular member.

23. A container for a vessel, comprising:

a flexible liner positionable in the vessel, the liner having an inner surface and an outer surface;

a flexible tube including a planar contact surface positioned against and heat sealed to an outer surface of the liner such that the liner contacts and extends along the planar contact surface, thereby securing the tube directly and substantially perpendicular to the outer surface of the liner; and an integrated closure mechanism on an upper portion of the flexible liner.

24. The container of claim 23, further comprising a slide lock configured to slide along the integrated closure mechanism between a closed configuration and an open configuration.

* * * * *